(12) United States Patent
Kuznetsov

(10) Patent No.: US 11,742,661 B2
(45) Date of Patent: Aug. 29, 2023

(54) AUGMENTED BUS IMPEDANCE AND THUMP CONTROL FOR ELECTRICAL POWER SYSTEMS

(71) Applicant: Raytheon Company, Waltham, MA (US)

(72) Inventor: Stephen B. Kuznetsov, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 17/073,219

(22) Filed: Oct. 16, 2020

(65) Prior Publication Data

US 2022/0123555 A1 Apr. 21, 2022

(51) Int. Cl.
| | |
|---|---|
| *H02J 3/16* | (2006.01) |
| *H02J 3/18* | (2006.01) |
| *H02K 7/02* | (2006.01) |
| *H02P 9/00* | (2006.01) |

(52) U.S. Cl.
CPC .............. *H02J 3/16* (2013.01); *H02J 3/1885* (2013.01); *H02K 7/025* (2013.01); *H02P 9/007* (2013.01)

(58) Field of Classification Search
CPC .......... H02J 3/16; H02J 3/1885; H02K 7/025; H02P 9/007
USPC ........................................................... 307/31
See application file for complete search history.

(56) References Cited

U.S. PATENT DOCUMENTS

| | | | | |
|---|---|---|---|---|
| 3,667,012 A | * | 5/1972 | Kilgore ................... | H02P 27/05 318/800 |
| 4,292,572 A | * | 9/1981 | Ivy ............................ | H02P 5/68 318/52 |
| 9,306,386 B2 | | 4/2016 | Kuznetsov | |
| 9,373,963 B2 | | 6/2016 | Kuznetsov | |
| 9,531,247 B2 | | 12/2016 | Kuznetsov | |
| 9,531,289 B2 | | 12/2016 | Kuznetsov | |
| 9,667,232 B2 | | 5/2017 | Kuznetsov | |
| 9,705,314 B2 | | 7/2017 | Kuznetsov | |
| 9,837,996 B2 | | 12/2017 | Kuznetsov | |
| 9,911,532 B2 | | 3/2018 | Gupta et al. | |
| 10,298,212 B2 | | 5/2019 | Kuznetsov | |
| 10,491,074 B2 | | 11/2019 | Kuznetsov | |
| 2016/0336928 A1 | * | 11/2016 | Kuznetsov .............. | H02J 15/00 |
| 2019/0036336 A1 | | 1/2019 | Kuznetsov | |

(Continued)

FOREIGN PATENT DOCUMENTS

WO    WO-2016066396 A1 *   5/2016    ............. B63H 23/24

OTHER PUBLICATIONS

International Search Report and Written Opinion of the International Searching Authority dated Jan. 26, 2022 in connection with International Patent Application No. PCT/US2021/053173, 11 pages.

*Primary Examiner* — Daniel Kessie
*Assistant Examiner* — Dru M Parries

(57) ABSTRACT

A system includes a power distribution bus configured to distribute power from an electrical power source. The system also includes a plurality of electrical loads configured to receive portions of the power from the electrical power source. The system further includes a doubly-fed induction machine (DFIM) configured to reduce transmission impedance on the power distribution bus in response to a change in real or reactive power at one or more of the electrical loads, and reduce low frequency power oscillations at the source.

20 Claims, 21 Drawing Sheets

(56) References Cited

U.S. PATENT DOCUMENTS

2019/0199094 A1    6/2019  Kuznetsov
2019/0199255 A1    6/2019  Hu et al.
2019/0393754 A1*  12/2019  Kuznetsov ............. H02K 47/22

* cited by examiner

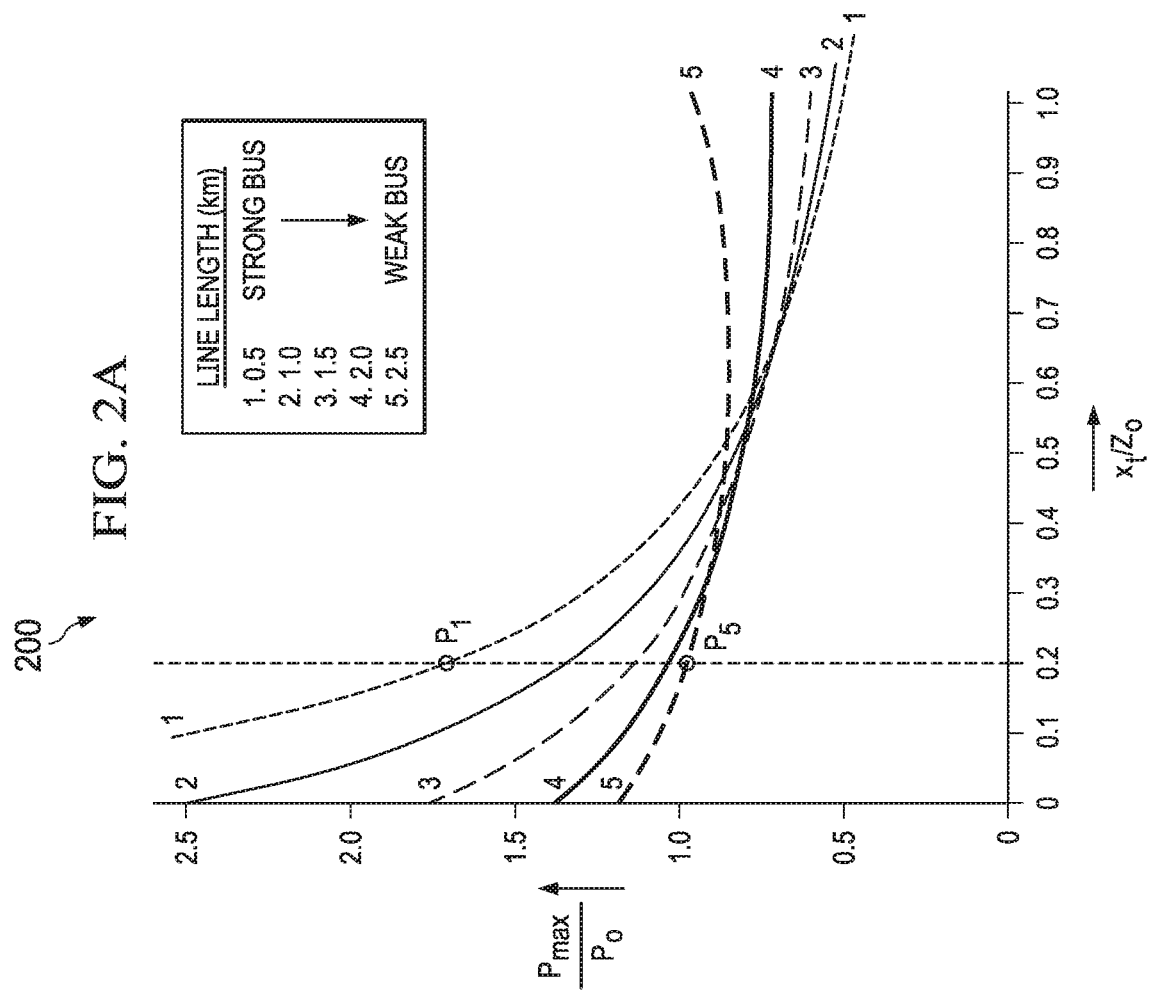

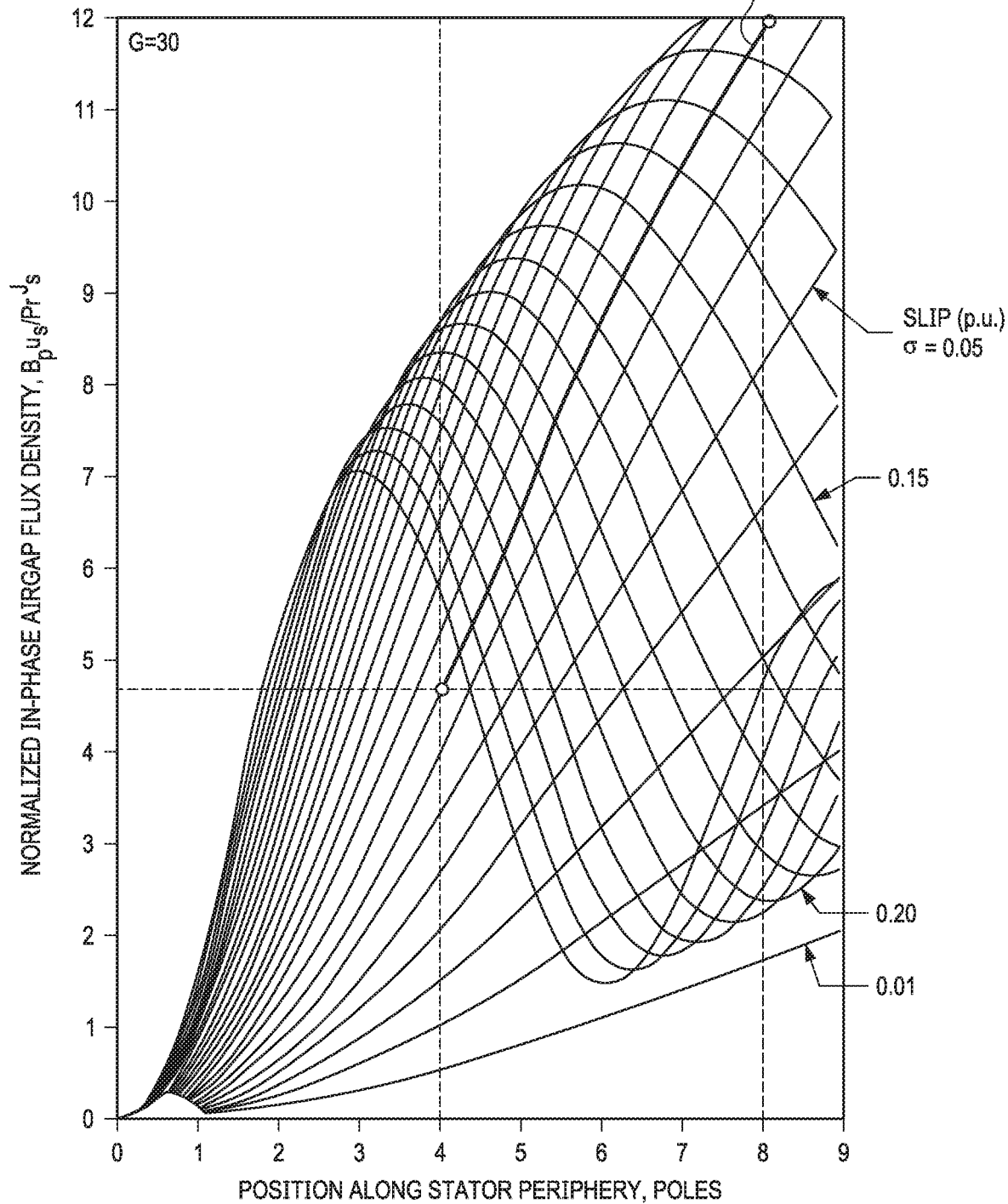

Figure 77. The power circle diagram (right) represents the power relationships in the converter, for a given constant loading, over the whole range of load diagrams (left). Example with $d_x = 0.1$. Steady-state conditions, large inductance ratio $L/L_k$. Discontinuous current region ignored Figure 81. With increasing current loading $i_d$ the fundamental frequency reactive power in the three-phase system increases continuously. The active power, on the other hand, goes through a maximum. Three-phase bridge in the rectifier mode with delay angle $\alpha$ as parameter. Steady-state conditions. Reference values for $p$ and $q_1$: $V_{d i o} \times I_{dk}$ Figure 83. During acceleration in a converter drive the frequency $f_1$ of the alternating current is less than the supply frequency $f_v$. The fundamental frequency reactive power $q_1$ calculated in the individual periods lies under the values given by the steady-state power diagram (Figure 76). Example Figure 84. The mean reactive power $\bar{q}_1$ drawn by the converter during acceleration from $\alpha = 90°$ to $\alpha = 0°$ is less than that corresponding to the steady-state power diagram (Figure 73) (commutation reactive power neglected). $m$ = total acceleration time in cycles. Example

US 11,742,661 B2

AUGMENTED BUS IMPEDANCE AND THUMP CONTROL FOR ELECTRICAL POWER SYSTEMS

TECHNICAL FIELD

This disclosure is directed in general to electrical power systems using electric machinery. More specifically, this disclosure relates to augmented bus impedance and thump control for electrical power systems having pulsating loads.

BACKGROUND

Many modern variable-speed drives or radar power supplies on ships have little or no energy storage. Consequently, transient swings in output power exhibit correspondingly large energy swings on the main alternating current (AC) bus with consequent voltage fluctuations. When large real power fluctuations occur, these are accompanied by large swings in reactive power (kVAR) on the ship power system and affect generator operations at the highest level, including the nuclear reactor valve response. Existing ships with medium voltage AC distribution have minimal control of reactive power, and no static volt-ampere-reactive (VAR) compensators are used.

SUMMARY

This disclosure provides systems for augmented bus impedance and thump control for electrical power systems.

In a first embodiment, a system includes a power distribution bus configured to distribute power from an electrical power source. The system also includes a plurality of electrical loads configured to receive portions of the power from the electrical power source. The system further includes a doubly-fed induction machine (DFIM) configured to reduce transmission impedance and voltage drop on the power distribution bus and provide energy storage capability in response to a change in power at one or more of the electrical loads.

In a second embodiment, a system includes a power generator configured to generate power for a plurality of electrical loads. The system also includes a power distribution bus configured to receive and distribute power from the power generator. The system further includes a DFIM configured to reduce transmission impedance and voltage drop on the power distribution bus in response to a change in real or reactive power at one or more of the electrical loads.

In a third embodiment, a method includes generating power for a plurality of electrical loads using an electrical power generator. The method also includes receiving the power at a power distribution bus and distributing at least some of the power for use at the electrical loads. The method further includes reducing transmission impedance and voltage drop on the power distribution bus using a DFIM in response to a change in reactive power at one or more of the electrical loads, and enhancing system stability.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 2A illustrates an example graph depicting transmissible power as a function of generator reactance in the system of FIG. 1 according to this disclosure;

FIG. 3A through 3D illustrate example graphs depicting a wide range of control for reactive power output of a doubly-fed induction machine (DFIM) according to this disclosure;

DETAILED DESCRIPTION

Figure 1:
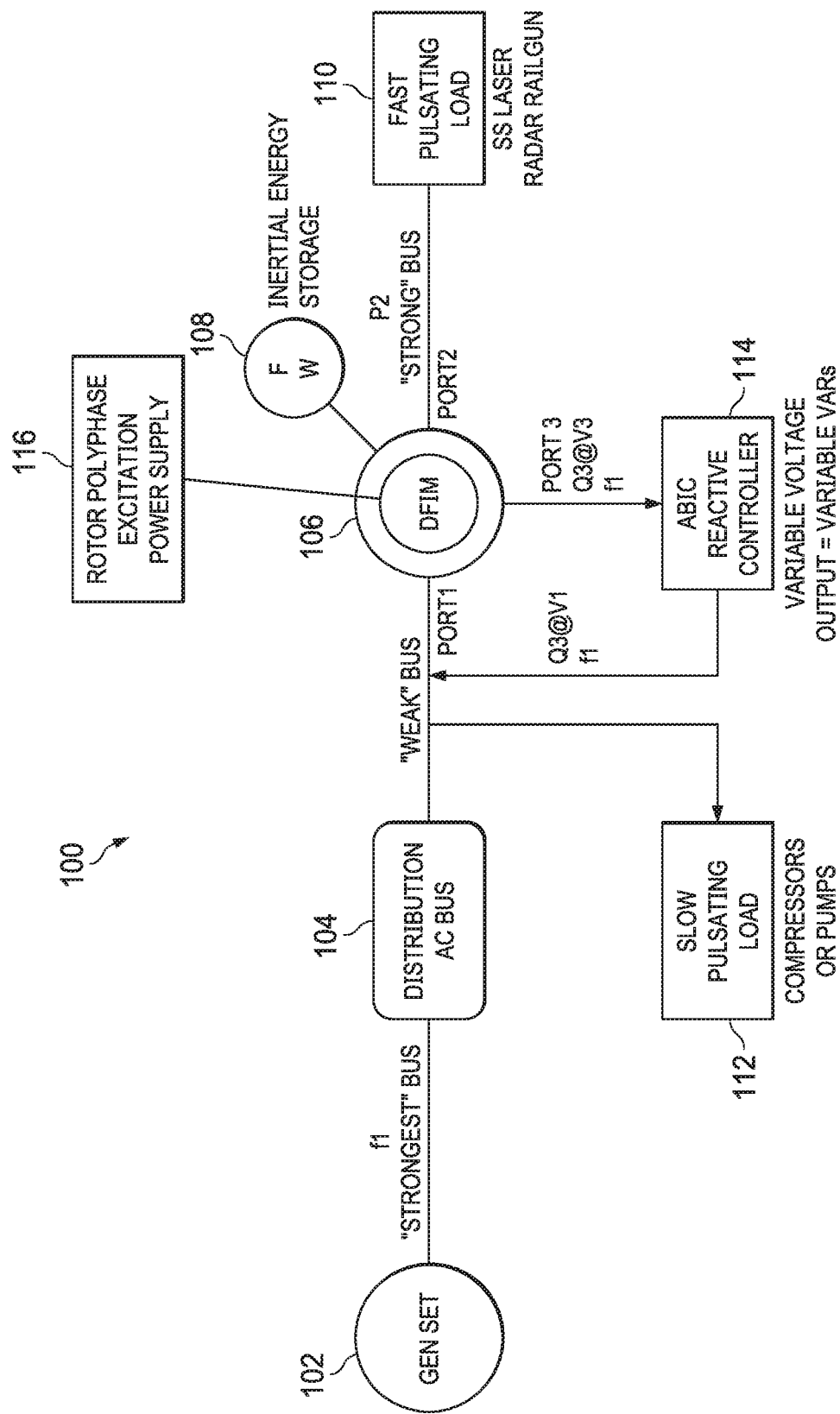
FIG. 1 illustrates an example system for augmented bus impedance control (ABIC) according to this disclosure.

FIGS. 1 through 9, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

As discussed above, many modern industrial variable-speed drives or radar power supplies on ships have little or no energy storage. Consequently, transient swings in output power exhibit correspondingly large energy swings on the main alternating current (AC) bus with consequent voltage fluctuations. When large real power fluctuations occur, these are accompanied by large swings in reactive power on the ship power system and affect generator operations at the highest level, including the nuclear reactor valve response. Existing ships with medium voltage AC (MVAC) distribution (such as 4.16 kV to 13.8 kV) have minimal control of reactive power, and no static volt-ampere-reactive (VAR) compensators are used.

Modern ship power systems have a combination of pulsating loads of both low frequency/low pulse repetition frequency (PRF) and high frequency/high PRF combining on a common AC power distribution system. Interference between pulsating loads is a major problem on many military ships. For example, radar alternating current-to-direct current (AC/DC) power converters negatively interact with conventional variable-speed drives used for compressors and pumping equipment. To properly solve this problem on the megawatt scale, a combination of energy storage management and reactive power modulation is desired.

This disclosure provides various embodiments of augmented bus impedance control for electrical power systems. The disclosed embodiments combine real and reactive power control with active energy storage to stiffen the AC bus, reduce voltage sag, and significantly reduce "thump" (low frequency power oscillations). The disclosed embodiments use a doubly-fed multi-port induction machine to provide the reactive control and thump energy for compensation in "weak" AC power systems. Naval ships with long transmission distances from prime power generators to load sites may constitute weak systems since series electrical reactance is quite high. The disclosed embodiments improve voltage regulation and reactive power stability on these type of systems. Mitigation of thump is desirable for both land-based and ship-based power systems having fluctuating or stochastic loads.

It will be understood that embodiments of this disclosure may include any one, more than one, or all of the features described here. Also, embodiments of this disclosure may additionally or alternatively include other features not listed here. While the disclosed embodiments may be described with respect to naval ships and early warning radar power systems, these embodiments are also applicable in any other suitable systems or applications.

FIG. 1 illustrates an example system 100 for augmented bus impedance control (ABIC) according to this disclosure. Some embodiments of the system 100 can be used for naval ship power systems, although other uses are within the scope of this disclosure. As discussed above, ABIC represents a combination of real and reactive power control with energy storage to stiffen the AC bus, reduce voltage sag, and reduce "thump."

As shown in FIG. 1, the system 100 includes a generator set 102 (such as a turbine generator) that provides power at a frequency f1 to an AC power distribution bus 104. The system 100 also includes a doubly-fed induction machine (DFIM) 106 that provides real power and energy storage to a fast pulsating load 110 (such as a laser, radar, railgun, or the like) and also provides a source of adjustable reactive power for providing voltage/VAR support for the power distribution bus 104. The DFIM 106 is an electrical machine which has bi-directional power flow for both real and reactive power into or out of its stator or primary windings; the DFIM 106 is controlled by excitation AC power fed to its rotor or secondary winding.

The power distribution bus 104 distributes the power from the generator set 102 to the DFIM 106 and to a slow pulsating load 112. The slow pulsating load 112 is a "housekeeping" load that can represent one or more compressors, pumps, and the like. Portions of the power distribution bus 104 can be characterized as a "strong" bus or a "weak" bus depending on various factors. One factor is how much voltage fluctuation occurs at the fast pulsating load 110 when the current fluctuates by a specified amount (such as 80 percent). In a weak bus, the voltage at the fast pulsating load 110 may fluctuate significantly (such as by 20 percent or more). In a strong bus, the voltage fluctuates much less (such as 5 percent or less). A weak bus can be due to intermediate transformers plus transmission cable inductances that are present over a long transmission distance (such as about 800 feet or more). Another factor that characterizes the bus strength is the short circuit rating. For example, a strong bus may have a higher short circuit rating (such as 40 MVA), while a weak bus may have a lower short circuit rating (such as 6 MVA).

The DFIM 106 is a rotating machine and may have about twice the capacitive energy storage density of an AC capacitor bank typically used in static VAR compensators (such as 8.43 MVAR/m$^3$ versus 4 MVAR/m$^3$). The DFIM 106 is coupled to a high-speed flywheel 108, which stores energy in the form of inertial energy, and also buffers the generator set 102 from oscillations in power associated with one of the electrical loads, thereby reducing system power surges. The flywheel 108 also helps the DFIM 106 reduce thump with a faster response time than standard ship turbine generators can respond. Reducing thump extends the life of all main electrical equipment.

As shown in FIG. 1, the DFIM 106 includes three stator winding ports. Port 1 is the primary power input to the stator, and Ports 2 and 3 are output ports on the stator. Port 1 receives input apparent power (MVA) from the unstable power distribution bus 104. Port 2 provides stable real power (on the order of megawatts) to the pulsating load 110 with recurrent power or current surges. The load 110 may be a rectified DC load or strictly AC load. Port 1 and Port 2 exchange power/energy with the flywheel 108. Port 3 produces leading power factor reactive power Q3 (MVAR), which is modulated by the action of the rotor (or secondary) excitation polyphase power input and this reactive power Q3 is injected into the power distribution bus 104. An ABIC reactive controller 114 adjusts the voltage level to obtain the correct VAR match to the respective load. The reactive power Q3 is generally proportional to the square of the output voltage of the DFIM 106. Port 3 supports a "synchronous condenser" function and utilizes the stored magnetic field of the DFIM 106 for source energy. Polyphase rotor excitation is obtained from a separate AC excitation power supply 116. This rotor excitation supply has the ability to change rotor current and voltage levels quickly on the order of one to two electrical cycles of the output power; consequently the output voltage at Ports 2 and 3 can be rapidly modulated. While FIG. 1 shows only one DFIM 106, this is merely one example. Other embodiments could include additional DFIMs 106, including one or more machines that rotate in the opposite direction.

FIG. 2A illustrates an example graph 200 depicting transmissible power as a function of generator reactance in the system 100 of FIG. 1 according to this disclosure. As shown in FIG. 2A, $P_{max}$ is the maximum normalized transmissible power from the generator set 102 to the load 110. The power is shown versus the generator reactance $X_t$ normalized to the transmission line characteristic impedance $Z_o$. Even though the transmission line is mostly inductive and regardless of how long it is, the transmission line has a demand for reactive power. The curves labeled 1 through 5 in the graph 200 represent transmission lines of different lengths. Curve 1 is a transmission line with the shortest length (such as 0.5 km) or the "strongest" bus. Curve 5 is a transmission line with the longest length (such as 2.5 km) or the "weakest" bus.

The point $P_1$ represents a desired operating point for typical fixed reactance $X_t/Z_o=0.20$ per unit, since maximum power $P_{max}=2.5$ per unit. Quantity $P_o$ is the nominal output power of the source generator. For the same generator reactance $X_t/Z_o=0.20$, point $P_5$ is the least desirable operating point since $P_{max}$ is only 1.0 per unit. It may be desired or necessary to have the ratio $P_{max}/P_o$ be large and greater than 1.0. The system 100 changes an operating point $P_5$ on a medium- to long-length transmission line to an operating point between $P_1$ and $P_5$ (by increasing permissible real power) depending on the level of VAR injection (Q3@V1 in FIG. 1) by the shunt connected DFIM 106. In practice, systems typically do not use $X_t/Z_o>0.40$ since the voltage drop is large. The disclosed embodiments also cover the need for reactive power to compensate for reactive demand of a AC/DC controlled rectifier system and a DC load further downstream from the DFIM as detailed herein.

Figure 2B:
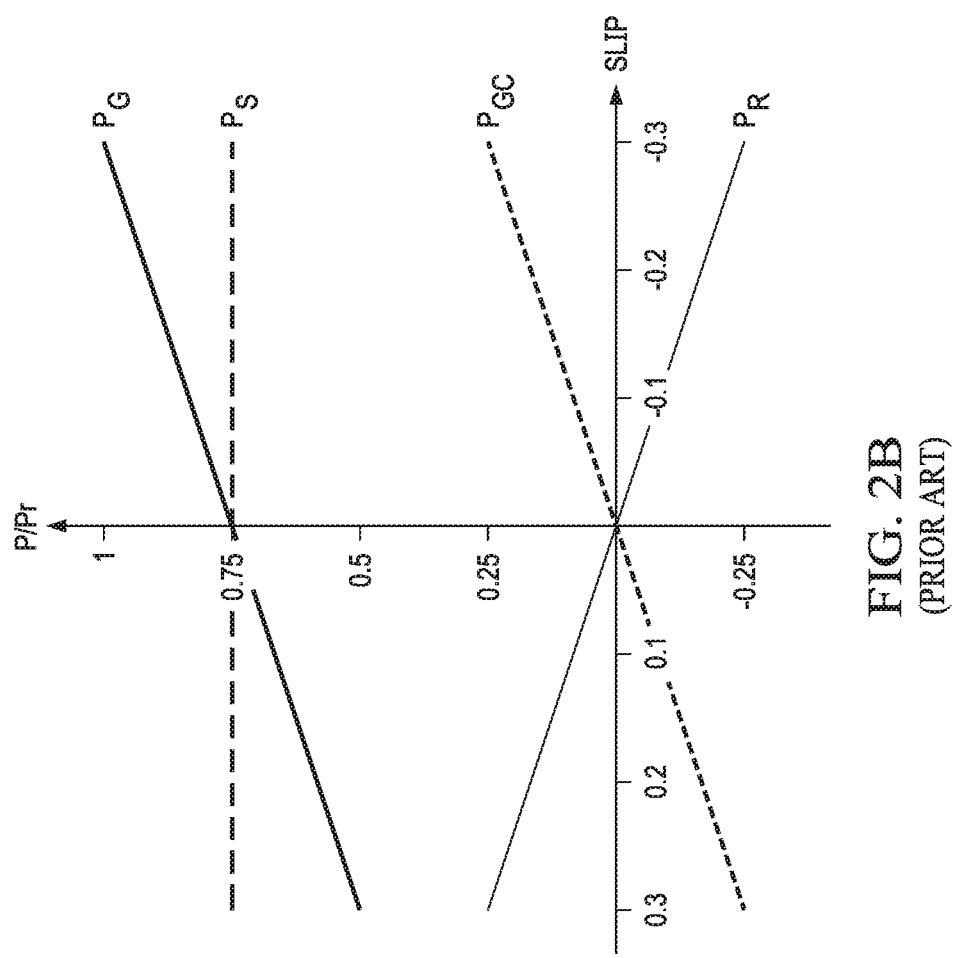
FIG. 2B illustrates a range of operation for conventional doubly-fed induction generators at positive and negative slip values.

FIG. 2B illustrates a range of operation for conventional doubly-fed induction generators at positive and negative slip values. In FIG. 2B, the real power output $P_G$ is for the stator circuit of a conventional doubly-excited wound-rotor induction machine as connected to the source, where $P_S$ is the nominal source power level. The positive slip value indicates the machine is operating as a motor, has a positive flow of power $P_R$ into the rotor and absorbing source energy. The negative slip value indicates the machine is operating as a generator, has a flow of power $P_R$ out of the rotor and giving back energy to the source. Rotor power is symmetrical about the zero slip value. The signal $P_{GC}$ is the control signal for estimating power to be returned to the source above and below nominal. One problem with this arrangement is that the source may not be able to absorb the excess energy developed by the rotor or its load which can be creating a thump condition or recurrent transient behavior. The disclosed embodiments solve this problem.

FIG. 3A through 3D illustrate example graphs 301-304 depicting a wide range of control for DFIM reactive power output according to this disclosure. In some embodiments, the graphs 301-304 can be based on a tertiary polyphase machine winding at 60 Hz output with variable slip excitation control frequency. Clearly the concept can be extended to frequencies well below 60 Hz and well above 60 Hz. The DFIM may be represented by the DFIM 106 of FIG. 1.

Figure 3A:
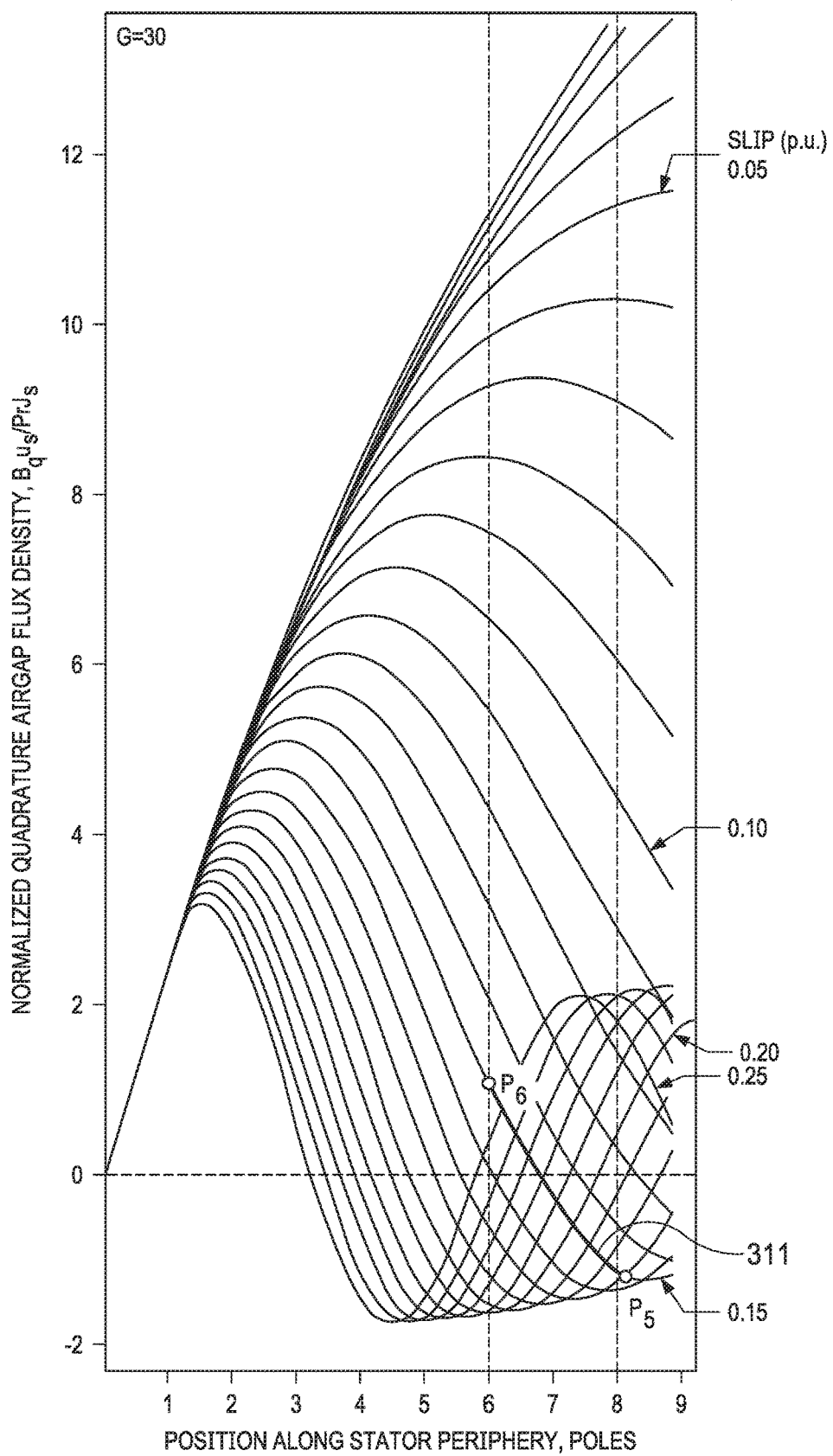

As shown in FIG. 3A, the graph 301 depicts the magnetic field quadrature density $B_q$ corresponding to reactive power output of the Q-axis winding as a function of the stator peripheral position corresponding to Port 1 and Port 3 windings in FIG. 1. The plot curve 311 indicates the reactive output magnetic field density $B_q$ of the Q-axis winding between poles 6 and 8. The plot curve 311 shows nearly equal positive and negative reactive power between point $P_6$ and point $P_8$ at about ±1 per unit quadrature magnetic flux density for the case of 15% slip. Here, reactive power is the spatial integral of the reactive output $B_q$ with stator current loading of the winding of Port 3 in FIG. 1.

Figure 3B:
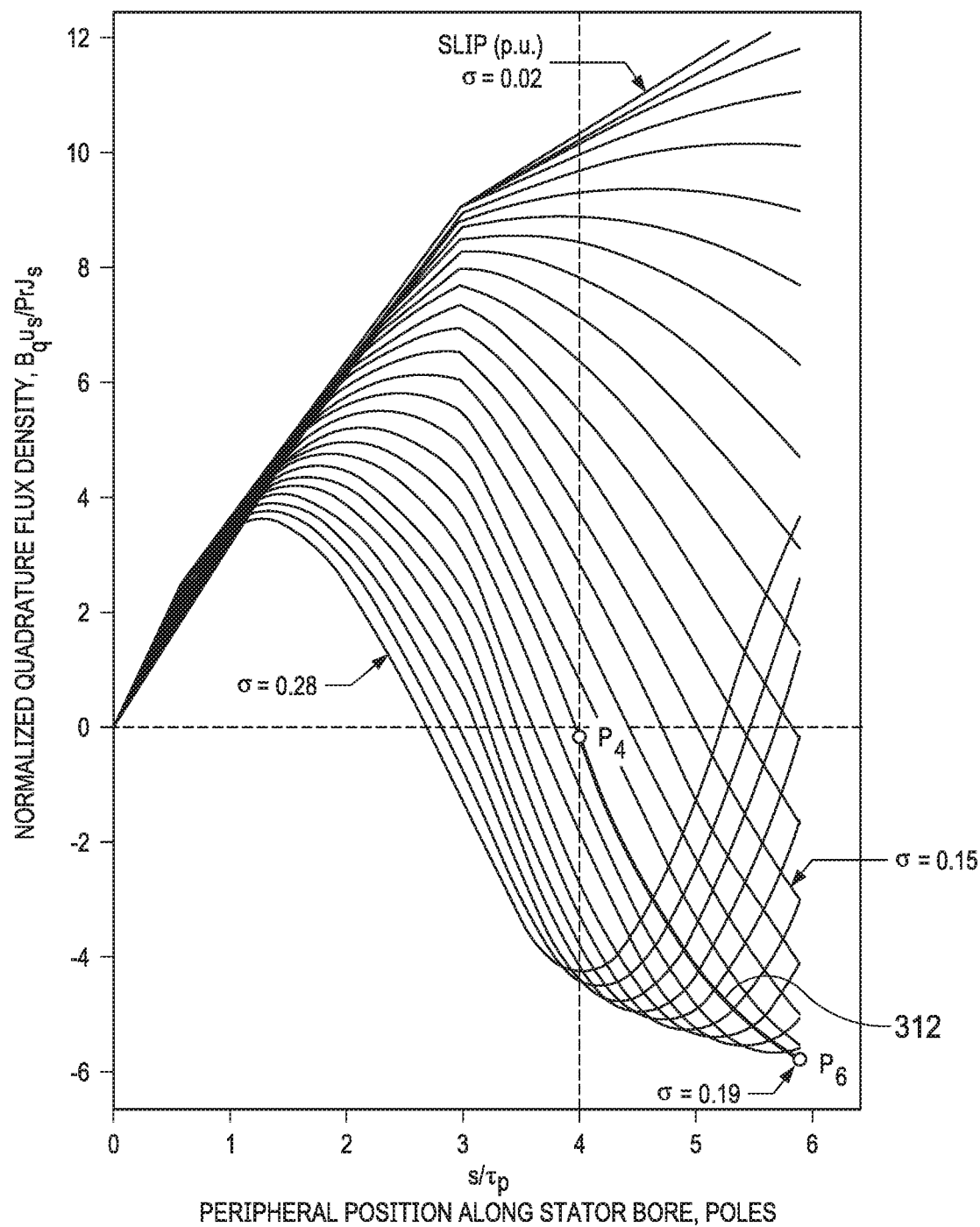

As shown in FIG. 3B, the graph 302 depicts the reactive output radial magnetic field density $B_q$ of the Q-axis winding as a function of stator peripheral position up to six poles. The plot curve 312 indicates the reactive output magnetic field density $B_q$ of the Q-axis winding between poles 4 and 6. The plot curve 312 shows reactive output from zero at point $P_4$ to highly leading capacitive output 5.8 per unit at point $P_6$ for the case of 19% slip. This characteristic has an auxiliary stator excitation winding aiding the VAR generation starting at the stator peripheral position s/Tp=3.0. Thus, when a purely reactive output is required to satisfy the medium frequency bus for reactive power, the DFIM can be operated at a slip of 19% and the output can be taken from windings located between poles 4 and 6, as indicated by the plot curve 312. The slip value is rapidly controlled by the rotor slip frequency excitation power supply in direct response to output reactive demand.

Figure 3C:
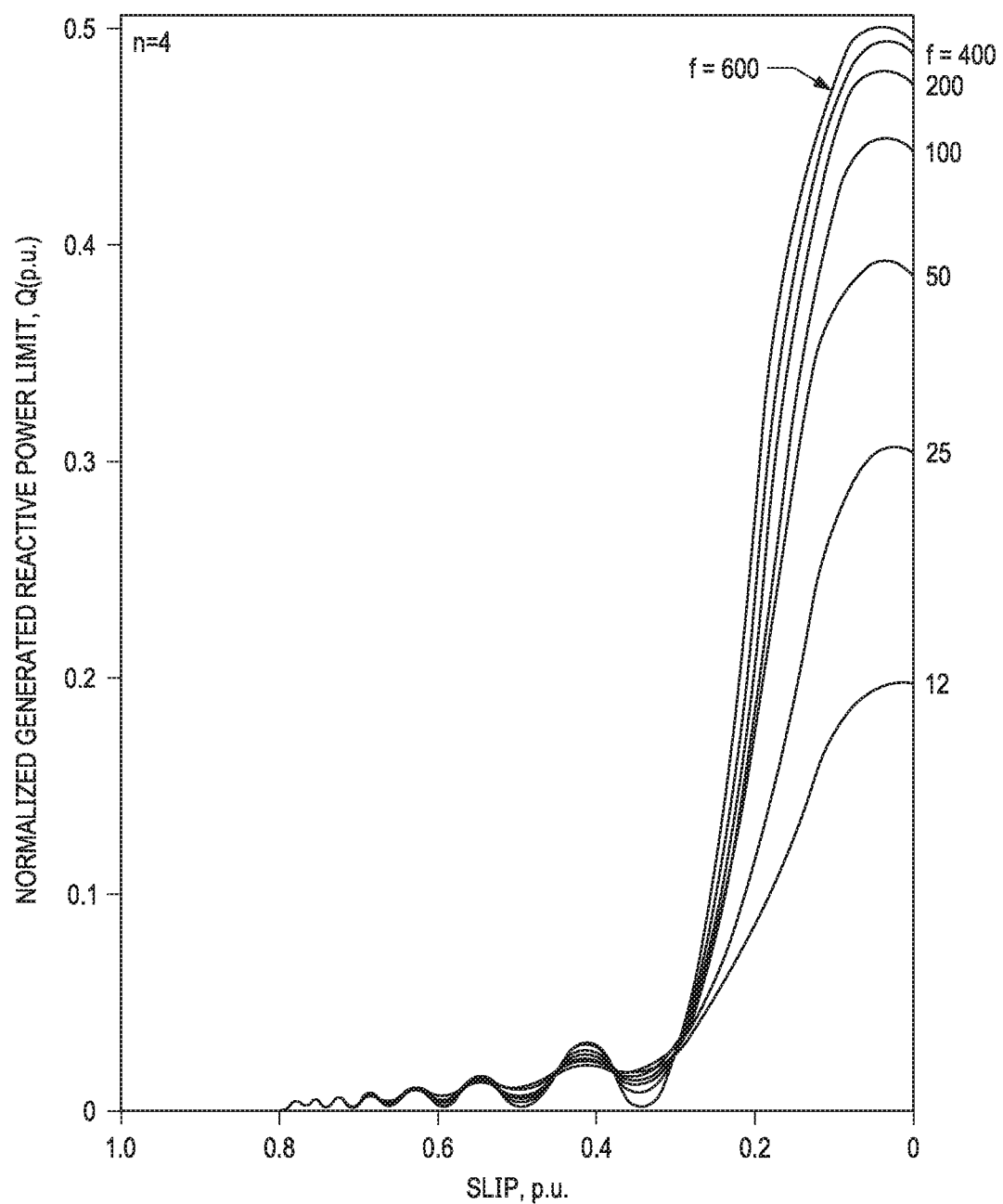

As shown in FIG. 3C, the graph 303 depicts the normalized limit of generated reactive power Q as a function of slip value (per unit) and output frequency f (Hz) for a 4-pole specialized induction generator. For machines in the f=50-600 Hz range, the reactive characteristic peaks at about 0.05 per unit slip. For a machine with two or three outputs, the total Q can be divided equally among the outputs by using a proper winding design. Machines of multiples of four poles utilize multiple repeatable sections of four poles.

As shown in FIG. 3D, the graph 304 depicts the in-phase normalized airgap radial flux density $B_p$ as a function of stator airgap peripheral location and slip value up to 0.25 per unit. The flux density $B_p$ is the main component of the real power output of the DFIM for either Ports 2 or 3. These curves shown in the graph 304, in scalar product with stator current loading (Amp-turns per meter periphery) then integrated over spatial location, predict the limit of real power absorbed by the stator winding at Port 2 and transferred to flywheel acceleration in a mode when the output loads are regenerative, thereby pumping energy back into the power system. For example, in some embodiments, a slip value of 0.05 to 0.11 per unit (positive or negative) can be most desirable. The curves shown are valid for one value of magnetization factor $G=X_m/R2=30$, where $X_m$ is the magnetizing reactance and R2 is the rotor resistance.

Figure 3E:
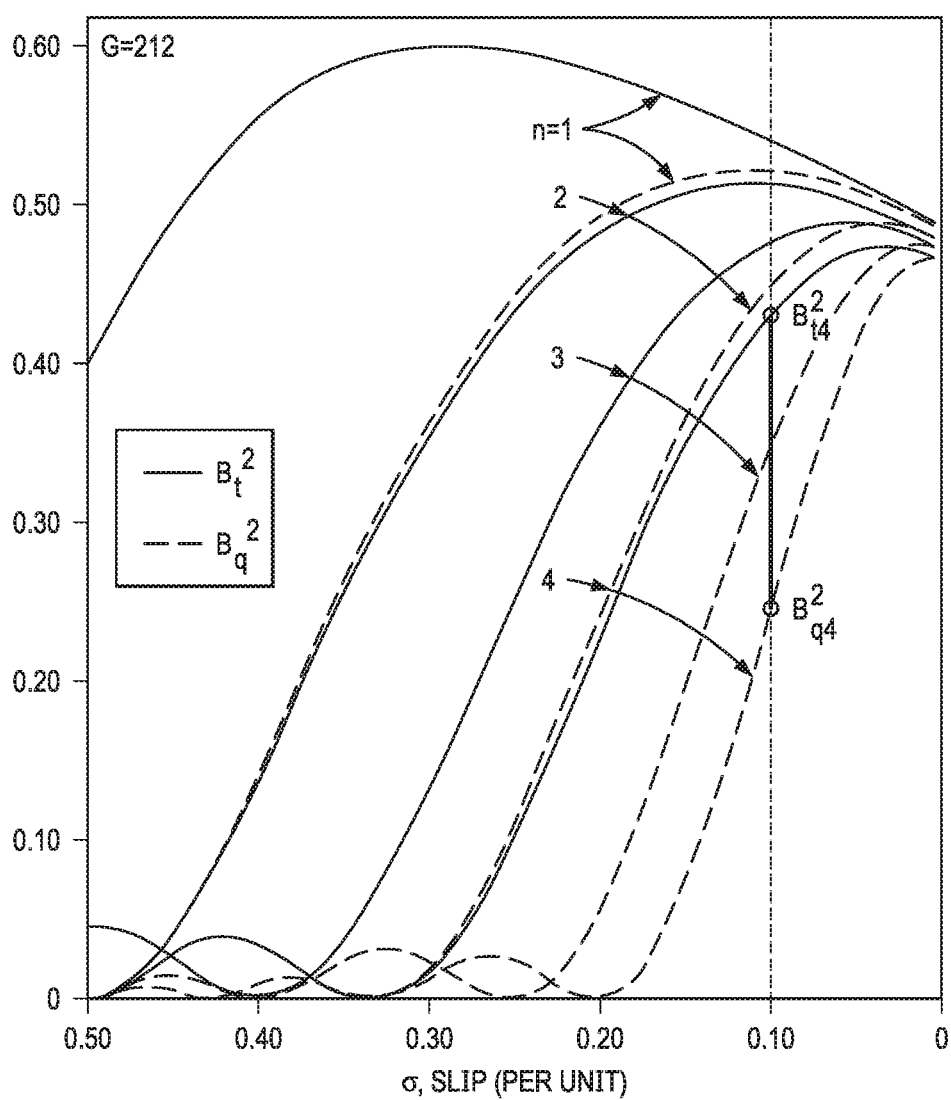
FIG. 3E illustrates a graph 305 for an example induction machine with tertiary windings and transient conditions with the ability to provide leading reactive power to an intermediate bus, according to this disclosure.
Figure 8A:
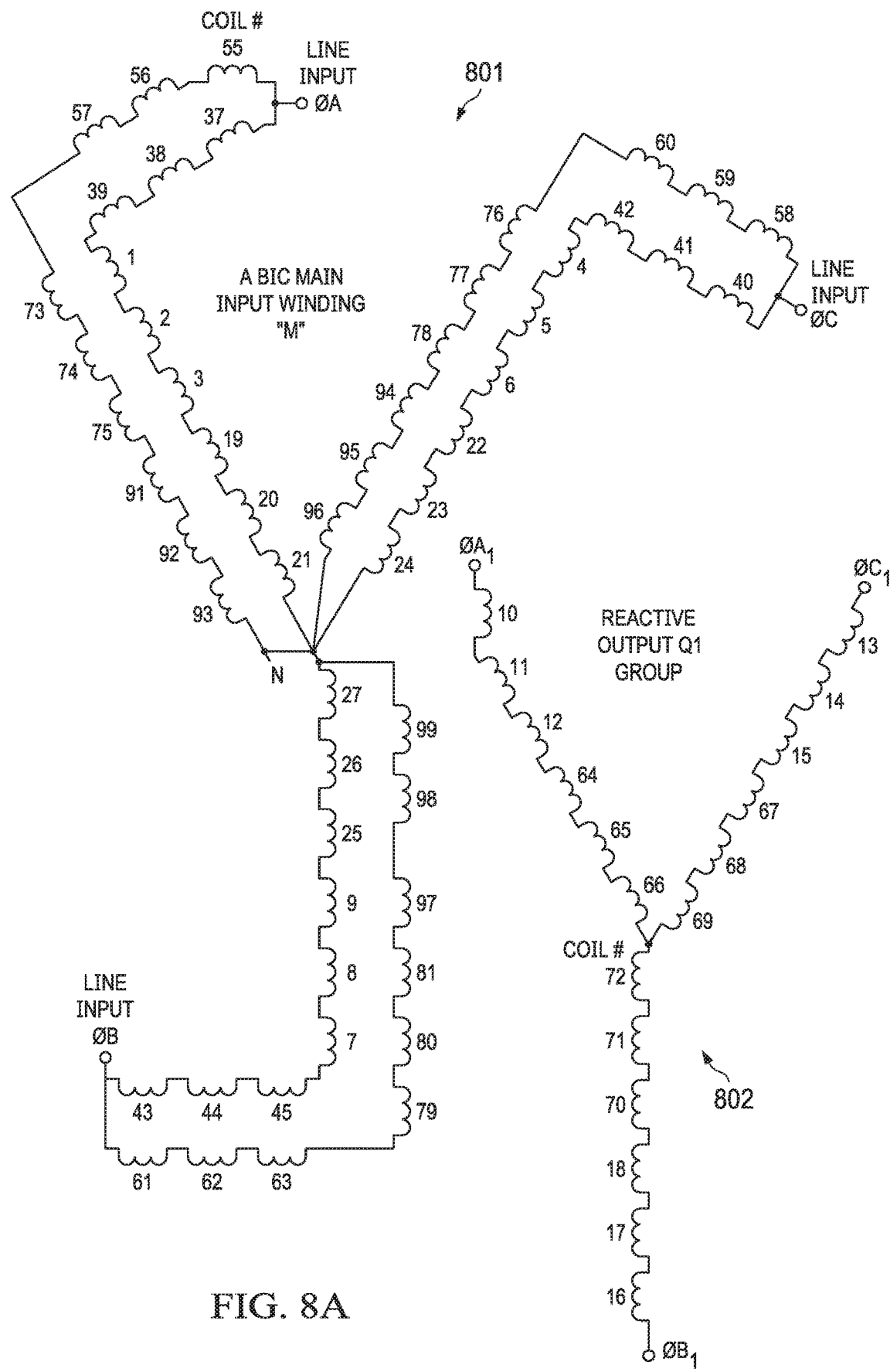
FIGS. 8A and 8B illustrate example winding diagrams for an ABIC machine according to this disclosure.
Figure 8B:
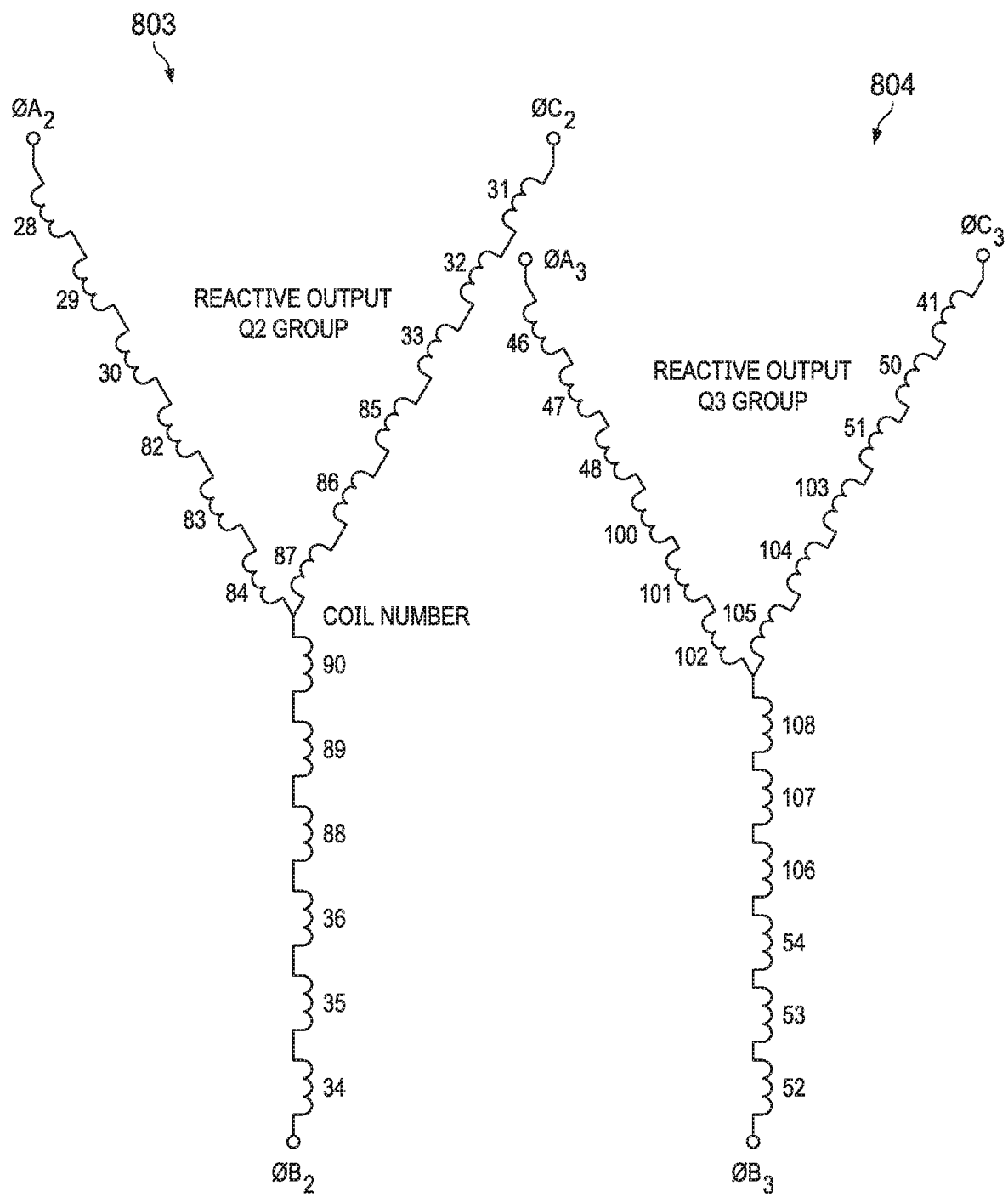

FIG. 3E illustrates a graph 305 for an example induction machine with tertiary windings and transient conditions with the ability to provide leading reactive power to an intermediate bus, according to this disclosure. The subject DFIM tertiary windings can output both real and reactive power for currents under certain limits which are hereby defined. In a spatial transient state as defined by the winding diagrams in FIGS. 8A and 8B, FIG. 3E shows a combination of total airgap flux density (as $Bt^2$) and quadrature flux density (as $Bq^2$) plotted as a function of per unit slip for different families of primary stator poles n=1 to n=4 in a repeatable section. After a repeatable stator section of primary windings, the stator periphery is wound with a section of polyphase tertiary windings and a spatial transient occurs. By example, a 12 pole machine would have 3 repeatable sections. The most useful characteristic is the n=4 family. As illustrated by the bold line, at a sample slip value of 10%, the $Bq^2$ value is 0.27 per unit (p.u.) and the $Bt^2$ value is 0.44 per unit. The difference between these two points is the in-phase component of magnetic flux density $Bp^2=0.17$ per unit. The relation $Bt^2=Bp^2+Bq^2$ holds for all slip values.

The component values are consequently: Bp=0.412 p.u., Bq=0.519 p.u., and Bt=0.663 p.u. The per unit base quantity is the value $Us/(p_r*Js)$ where Us is the synchronous field speed (ins), $p_r$ is the rotor surface resistivity (ohms) and Js is the stator current loading (A/m periphery). The curve in FIG. 3E indicates there is substantial real power (calculated as integral Bp*Js) available from the tertiary windings in addition to the larger reactive power (calculated as Integral Bq*Js) to absorb or yield thump reactive power from/to the load. It can be seen from FIG. 3E, as the slip is reduced to a value such as 5%, the relative level of Bp is reduced and eventually diminishes towards zero as the slip value approaches zero. This defines an operating mode for the disclosed embodiments; as the level of thump power increases, the adjustable frequency drive 414 to the DFIM 406 (described below with respect to FIG. 4) momentarily increases the slip value from a low slip to a higher value to yield a higher Bp and consequent higher real power capability for at least one of the tertiary windings to absorb real power from the oscillating or unstable load. The thump energy dissipates in the machine rotor rather than being sent back to the turbine source.

When a need arises for purely real power absorption by the DFIM windings (such as to transfer load energy to the flywheel), the machine can be operated at a slip value of 5-11% between poles 4 and 8 as shown in FIG. 3D. The 8% slip curve 313 shows $B_p$ increasing from 4.7 per unit to 12 per unit over this four-pole sector. In contrast, when the DFIM must provide both real and reactive support simultaneously, an intermediate slip value can be commanded by slip frequency regulation such as 16%. In-phase flux density $B_p$ is appreciable peaking at 9.8 per unit and quadrature flux density $B_q$ is 3.0 per unit (see FIG. 3B). The slip value is regulated at any machine speed $\omega_r$ by action of the DFIM rotor excitation circuit commanding synchronous speed $\omega_s$ whereby slip=$(\omega_s-\omega_r)/\omega_s$. Synchronous speed (in radians/second) is in direct proportion to the applied excitation frequency $f_s$ as $\omega_s=2*\pi\ f_s$/number of pole pairs. As modern drives can change frequency $f_s$ within a few milliseconds, the synchronous field speed of the rotor can be changed in the same short period, thereby allowing very fast control of where the DFIM output reactive power peaks.

Figure 4:
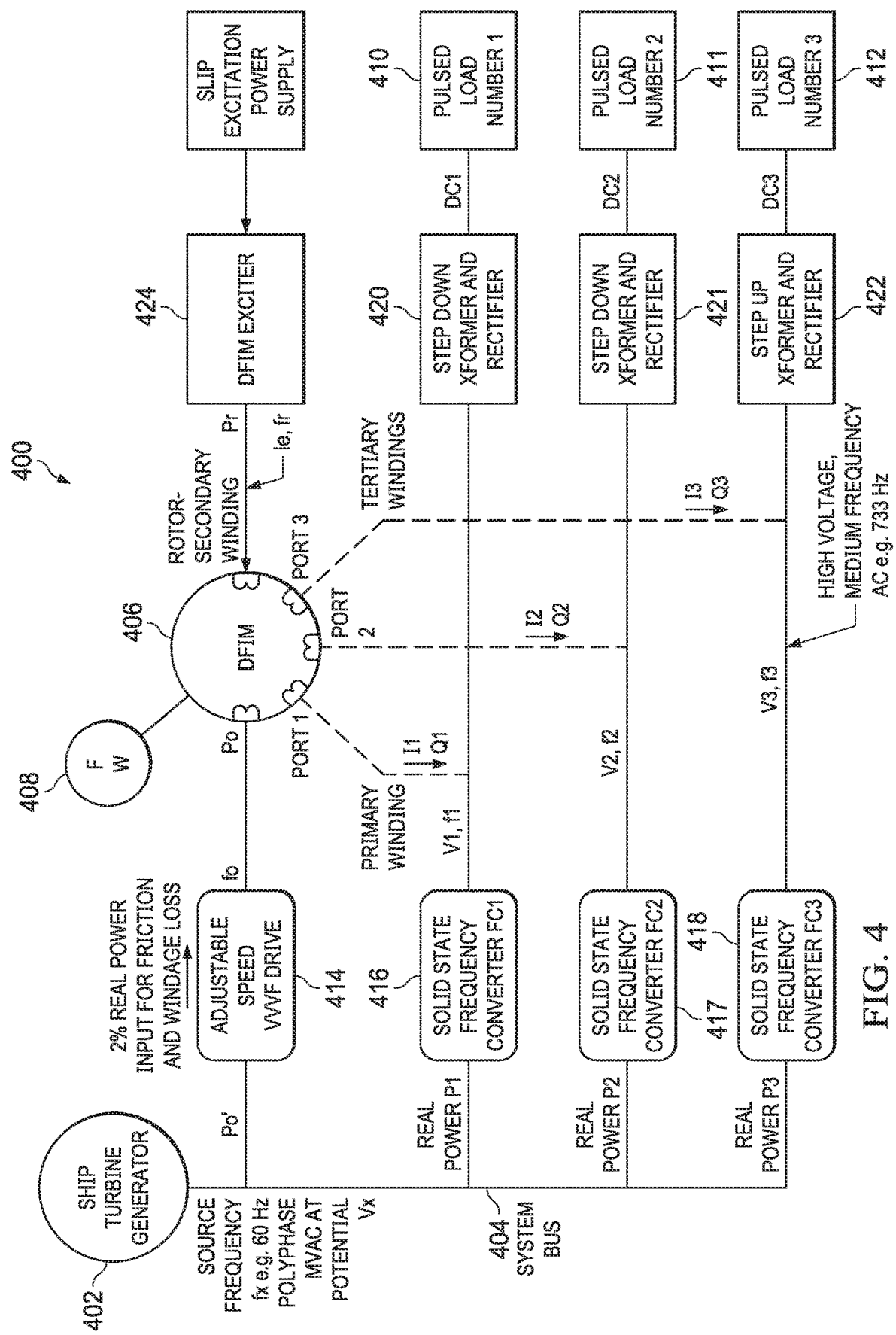
FIG. 4 illustrates another example system for ABIC according to this disclosure.

FIG. 4 illustrates another example system 400 for augmented bus impedance control (ABIC) according to this disclosure. As discussed below, the system 400 includes multiple components that are the same as, or similar to, corresponding components of the system 100 of FIG. 1.

As shown in FIG. 4, the system 400 includes a ship power generator 402 that provides power to an AC power distribution bus 404. In some embodiments, the generator 402 can be the same as, or similar to, the generator set 102 of FIG. 1. The generator 402 and bus 404 are at medium polyphase voltage potential such as 4160 Volts and frequency fx.

The system 400 also includes a DFIM 406 with multiple (such as three) polyphase tertiary winding ports 1-3, each compensating for a distinct pulsed load 410-412 (such as a radar, a jammer, an electromagnetic effector requiring a higher voltage input, and the like). The DFIM 406 comprises a non-symmetrical, space-transient winding that generates leading reactive power in the tertiary windings, that operates at a voltage level different from the primary or secondary windings, and compensates for at least some of the reactive power demanded by the pulsed loads 410-412. The DFIM 406 is coupled to an energy storage inertial flywheel 408 and is brought up to speed by an adjustable-speed variable-voltage variable-frequency (VVVF) drive 414 having source frequency fx at the input and frequency fo at the output. Real power Po is provided to the primary winding of the DFIM 406 by the VVVF drive 414 to compensate for acceleration power, friction losses, windage losses and primary $I^2R$ losses. Once the rotor and flywheel are up to rated speed, the DFIM 406 operates as a rotating condenser with adjustable output kVAR and kW characteristics. In some embodiments, the DFIM 406 includes an 8-pole machine and has an output range of 500-733 Hz based on a practical operating speed range of 7,500-11,000 rpm. Of course, other pole counts, output ranges, and operating speed ranges are possible and within the scope of this disclosure. Also, while FIG. 4 shows only one DFIM 406, this is merely one example. Other embodiments could include additional DFIMs 406, including one or more that rotate in the opposite direction.

The circuit for each load 410-412 has an AC-to-AC frequency converter 416-418 and a step-up or step-down transformer plus AC/DC rectifier 420-422 as appropriate to the desired input voltage to the load. The transformers 420-422 are provided to galvanically isolate the loads 410-412 from the source power. Each AC-to-AC frequency converter 416-418 converts the source frequency fx to an intermediate frequency f1, f2, f3 selected for the corresponding load 410-412. The advantage of a medium frequency intermediate link at f1, f2, f3 is the reduction in size of the transformer 420-422 and the reduction in filter component size, including the size of the DFIM 406. The architecture of the system 400 allows the rotor damper cage of the DFIM 406 to absorb higher harmonics generated by the AC/DC rectifiers 420-422 feeding the pulsating loads 410-412.

Each frequency converter 416-418 outputs a frequency f1, f2 or f3, which is substantially higher (such as 10×) than the source frequency fx. By using a DFIM exciter 424 to vary the excitation current Ie and frequency fr on the secondary (rotor) winding of the DFIM 406 to be inversely proportional to shaft speed, the output frequencies f1, f2 and f3 on the tertiary windings can remain substantially constant over wide speed variations, as energy is extracted or returned to the flywheel 408. Due to the magnetics design of the machine windings of the DFIM 406, frequencies f1, f2 and f3 are preferably equal and also of the same frequency as the output fo from the VVVF drive 414, which is injected into the main stator winding of the DFIM 406. The DFIM exciter 424 enables the tertiary winding output to provide leading or lagging reactive power to compensate for oscillating load condition power factor on a recurrent or transient basis.

Each pulsed load 410-412 has an equivalent reactance Xqq, as reflected to the input to the transformers 420-422. Three separate output tertiary windings at the DFIM 406 provide reactive currents I1, I2, I3 and reactive power Q1, Q2, Q3 (as $Q=I^2Xqq$) and associated reactive energy on a corresponding high frequency bus, albeit these can be at different line voltages V1, V2, V3 without restriction. As shown in FIG. 4, two loads 410-411 are matched with a step-down transformer 420-421, while the third load 412 has a step-up transformer 422. The frequency converters 416-418 have the ability to boost or buck the output voltage V1, V2, V3 above or below the source voltage Vx. The three outputs of the DFIM 406 have a common frequency, yet the output power/energy can be at substantially different rates (MW/s or MJ/s) and magnitudes.

The multiple tertiary output windings of the DFIM 406, each associated with one of the output ports 1-3, provide VAR support for the loads 410-412. The tertiary windings, responsive to the slip value operating range, also provide real power output or absorb real power (ref. FIG. 3D). Each output port 1-3 can provide leading reactive current and power to the corresponding load 410-412, which has a reactive demand or reactive power oscillation. This consequently reduces the reactive power demand on and physical size/weight of the frequency converters 416-418 providing mainly real power from the ship power generator 402. When a thump condition develops (which can be typical for radar and similar applications), the thump real-power energy is extracted from or returned to the flywheel 408, rather than adversely affecting the ship power generator 402. This reduces overall ship power modulation, which is especially important for nuclear powered aircraft carriers, which are sensitive to adverse power modulation.

The shunt connection of the DFIM 406 reduces the medium frequency bus impedance to a value below that which would exist without the DFIM connection, in much the same fashion as a static shunt capacitor reduces AC bus impedance, except that in the system 400, the effective bus impedance is adjustable by slip excitation control. The transformers 420-422 have an input reactive kVAR demand that is variable depending on conditions of the loads 410-412. The higher the pulsing rate (pulses/s) of each load 410-412, the higher is the reactive demand of the fundamental power and of the harmonic power at the input to the corresponding transformer/rectifier pair 420-422. The DFIM 406 controls the output of reactive power Q1, Q2, or Q3 by a combination of regulating the slip excitation current "Ie" and regulating the slip excitation frequency "fr" as explained below in conjunction with FIGS. 5A through 5D. The DFIM exciter 424 has a real power output Pr that compensates for winding losses in the DFIM rotor circuit.

The principles of lowering the impedance of the AC power distribution bus 404 depends on various factors. The DFIM 406 comprises a negative AC resistance at any output frequency when controlled in the low slip mode (such as 1.5-2.5%). The DFIM 406 is kept in the negative resistance region by use of a fast active rotor frequency controller (such as a variable frequency Insulated Gate Bipolar Transistor or IGBT drive) over wide speed/energy range. The negative resistance of the DFIM 406 does not rely upon a converter for this characteristic, although the three frequency converters 416-418 are employed to match the bus 404 (e.g., 60 Hz) to a DFIM output frequency (such as 1000 Hz) required to obtain high power density for both kW and kVAR output. In some embodiments, the system 400 can exhibit a reduction in bus impedance, such as from 0.63 Ohms to 0.12 Ohms at 60 Hz, although other values are possible and within the scope of this disclosure.

The DFIM 406 attains a high power density (such as 6 kVA/kg) when high shaft speeds are used. The frequency converters 416-418 are very compact, efficient, and lightweight. The reactive power (kVAR) output of the DFIM 406 is independent of the real power (kW) output within the overall kVA machine rating. The output port 3 operates on a substantially quadrature axis magnetic circuit, while the real power output of the output port 2 operates on a substantially direct axis magnetic circuit.

Figure 5A:
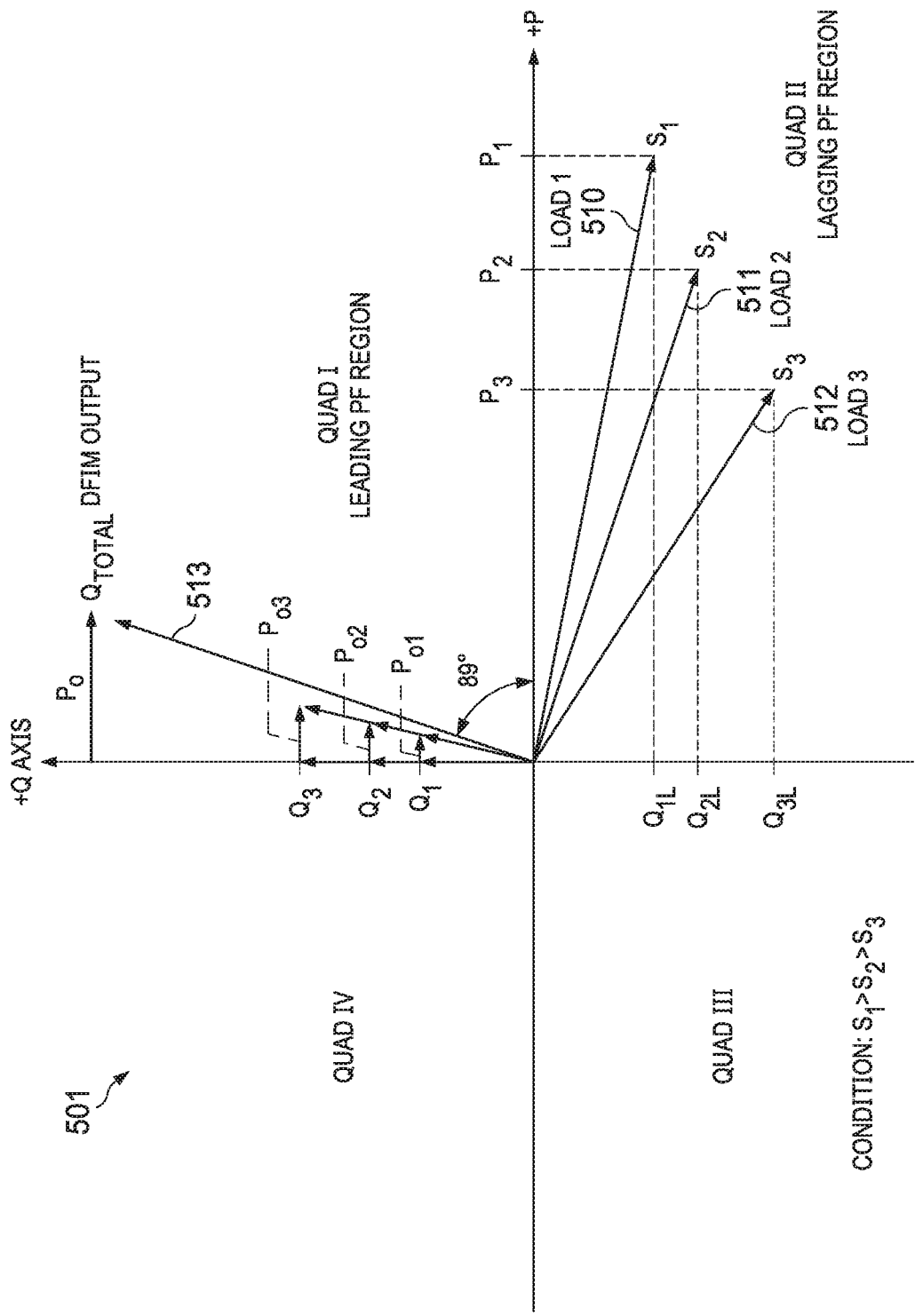
FIGS. 5A through 5D illustrate example phasor diagrams showing reactive power control by the DFIM of FIG. 4 according to this disclosure.

FIGS. 5A through 5D illustrate example phasor diagrams 501-504 showing reactive power control by the DFIM 406 according to this disclosure. In FIG. 5A, the phasor diagram 501 shows three pulsed loads (load 1, load 2, load 3) representing the three pulsed loads 410-412 of FIG. 4, respectively. In the phasor diagram 501, real power P is indicated by the X axis, and reactive power Q is indicated by the Y axis. As shown in FIG. 5A, the lines 510-512 represent the apparent powers S1, S2, S3 for the three pulsed loads, whereby apparent powers S1>S2>S3 and real powers P1>P2>P3. The output of the DFIM 406 (indicated by the line 513) in multiple windings/ports fully compensates for the three reactive powers Q1L>Q2L>Q3L, and real power is drawn through the frequency converters 416-418 exclusively.

Figure 5B:
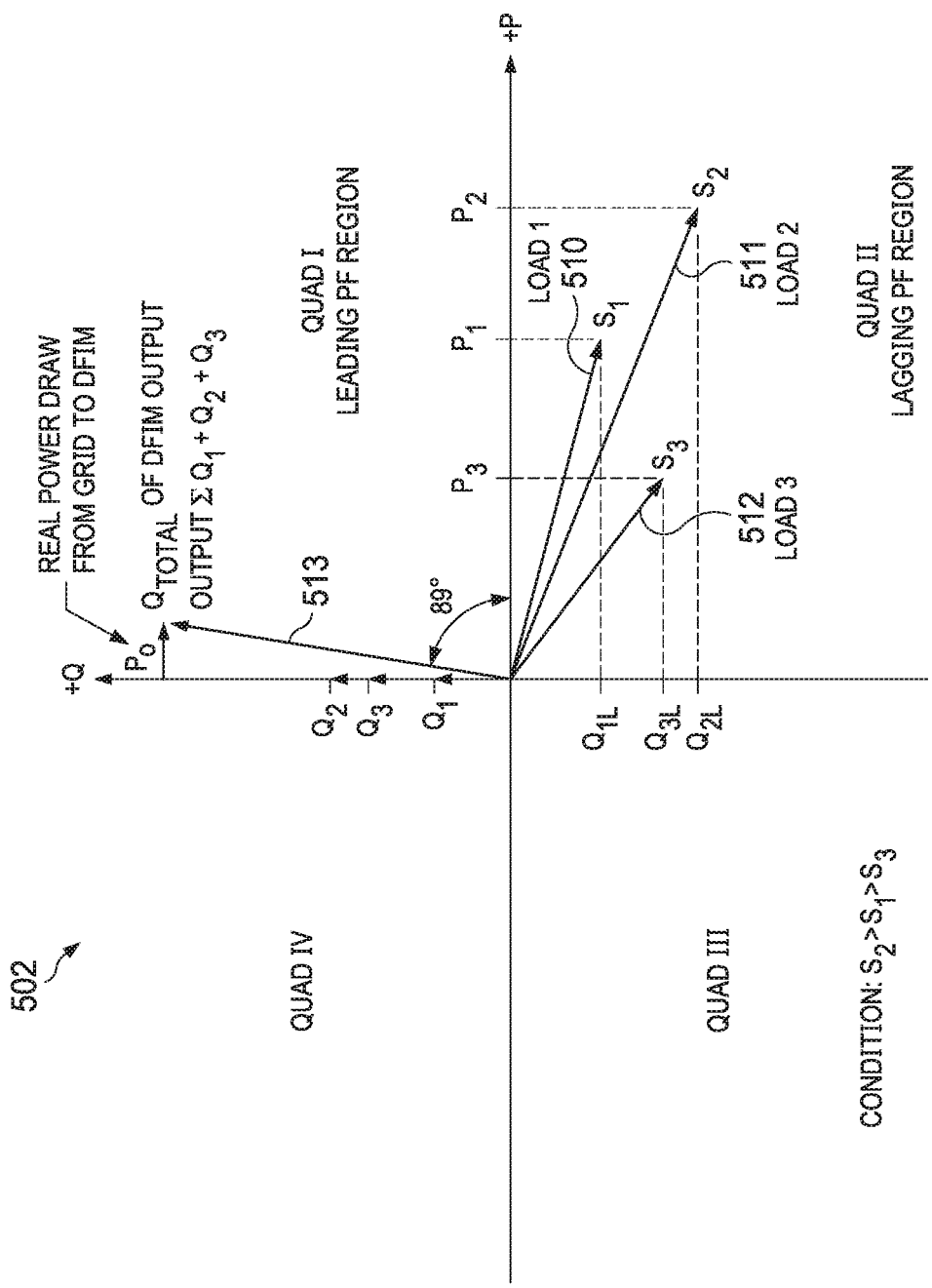

In FIG. 5B, the phasor diagram 502 shows a sudden change in load 2 (line 511), which now exceeds load 1 and load 3 (i.e., P2>P1>P3) and thus Q2L>Q1L>Q3L. The situation is stable and the DFIM 406 compensates for the change within 2-5 cycles, and the real power P2 of load 2 is increased by the frequency converter 417. The DFIM 406 operates at a phase angle of 88-89 degrees, since most of its output is reactive power and only a small amount of real power Po is used for friction and windage loss. In actual pulsed power implementations, load 2 may be oscillating with large real and reactive power swings between the conditions of FIG. 5A and FIG. 5B on a periodic basis at multiple times per second, or at a low frequency (such as 2 Hz), thus creating a thump condition. It is noted that in most cases, the frequency converters 416-418 are unidirectional in power flow, since the generator 402 (such as a gas turbine) cannot readily accept regenerative power from a large load.

Figure 5C:
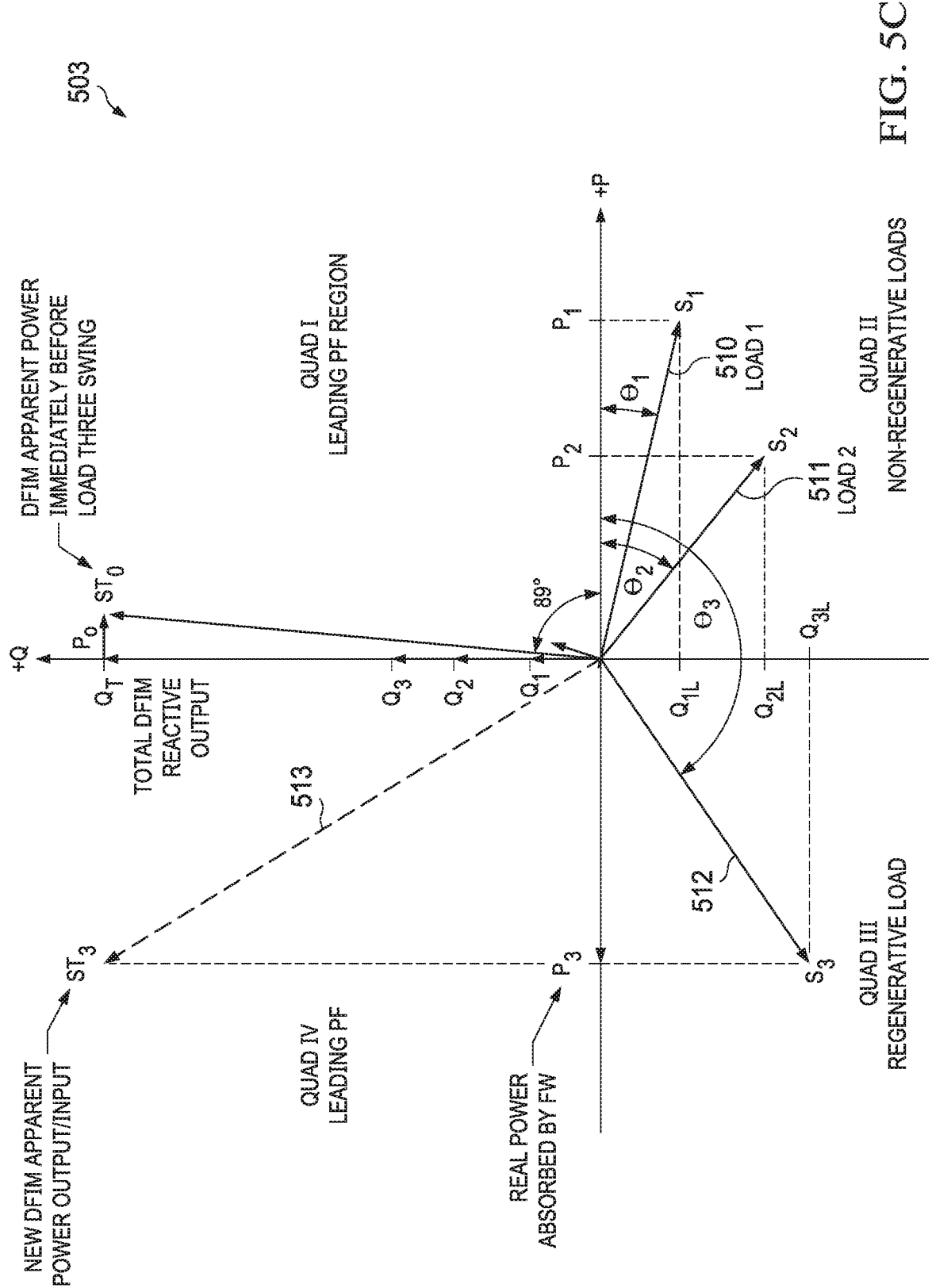

In FIG. 5C, the phasor diagram 503 shows a case where load 3 (line 512) suddenly changes from being a non-regenerative Quadrant II load to a Quadrant III load, which is regenerative. To protect the prime mover, if the frequency converter 418 is unidirectional, the system 400 can absorb the load energy E3 as real power by having the DFIM 406 absorb this power/energy P3/E3 and use this energy E3 to recharge the flywheel 408 coupled to the DFIM 406. This mode is shown in FIG. 5C, where the DFIM 406 (line 513) now operates in Quadrant IV, with phasor ST3 providing all reactive power for the three loads 410-412 and absorbing real power/energy from load 3 on a recurrent basis until such time as the flywheel 408 can no longer accept further energy increase and must discharge its energy to any of the loads 410-412.

The design of the DFIM 406 and the DFIM exciter 424 allows the swing of a load from Quadrant II to Quadrant III to occur on a stochastic basis or alternately on a periodic basis with rapid response. By absorbing the load energy into the flywheel 408, this eliminates thump energy that would otherwise be distributed throughout the system 400 (other than a prime mover source), which could result in undesirable over-voltage and transient effects. The system 400 allows for the DFIM 406 to have each output port 1-3 absorb thump energy independent of the adjacent ports and return each segment of thump energy to its attached energy storage unit while simultaneously providing reactive power compensation to each load.

Figure 5D:
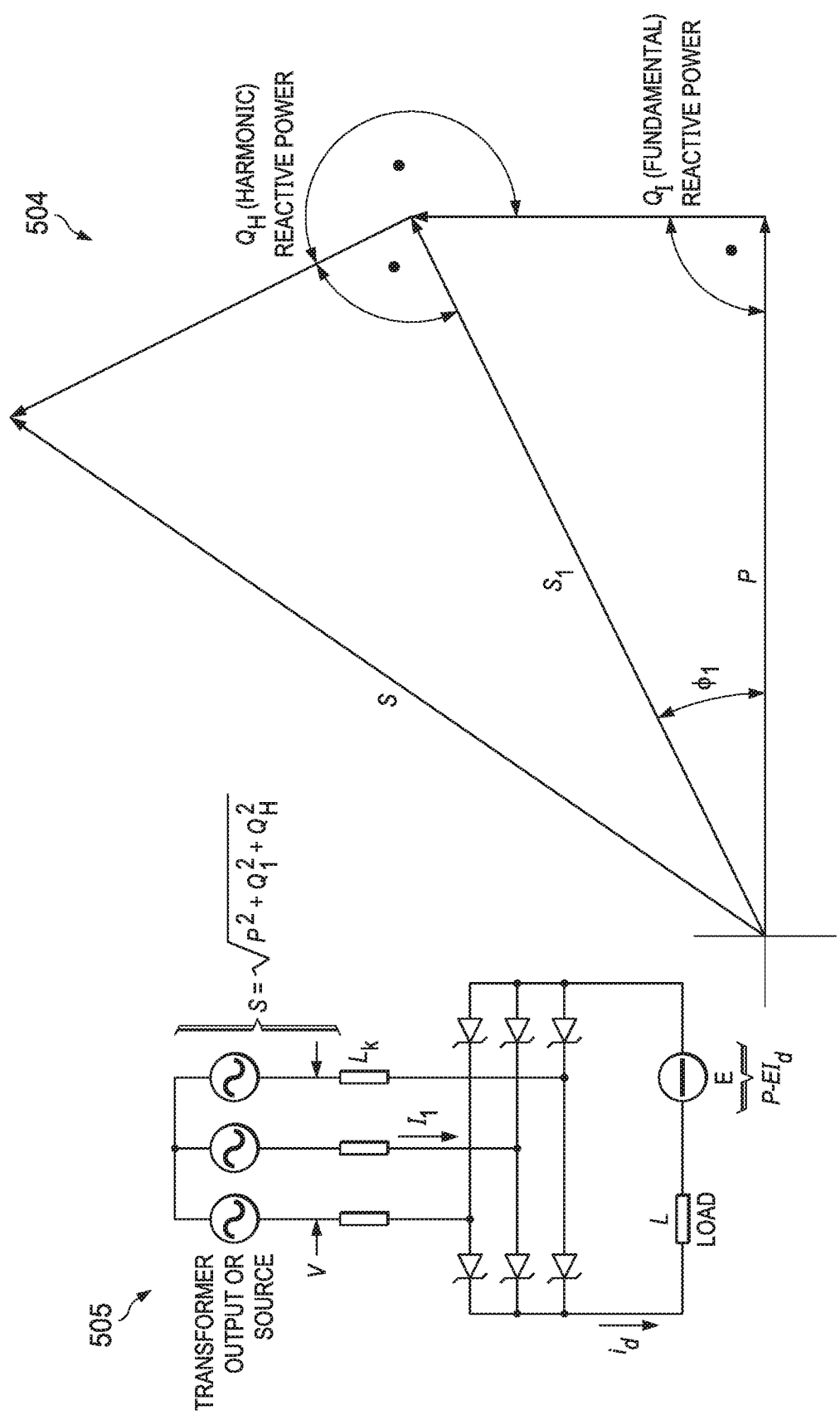

In FIG. 5D, the phasor diagram 504 is illustrative of a standard high power 6-pulse controlled AC-DC rectifier, such as the rectifiers 420-422 of FIG. 4. A circuit diagram 505 in FIG. 5D illustrates representative circuitry of such a high power 6-pulse controlled AC-DC rectifier. In the figure, $Q_1$ represents fundamental reactive power and $Q_H$ represents harmonic reactive power.

Figure 6:
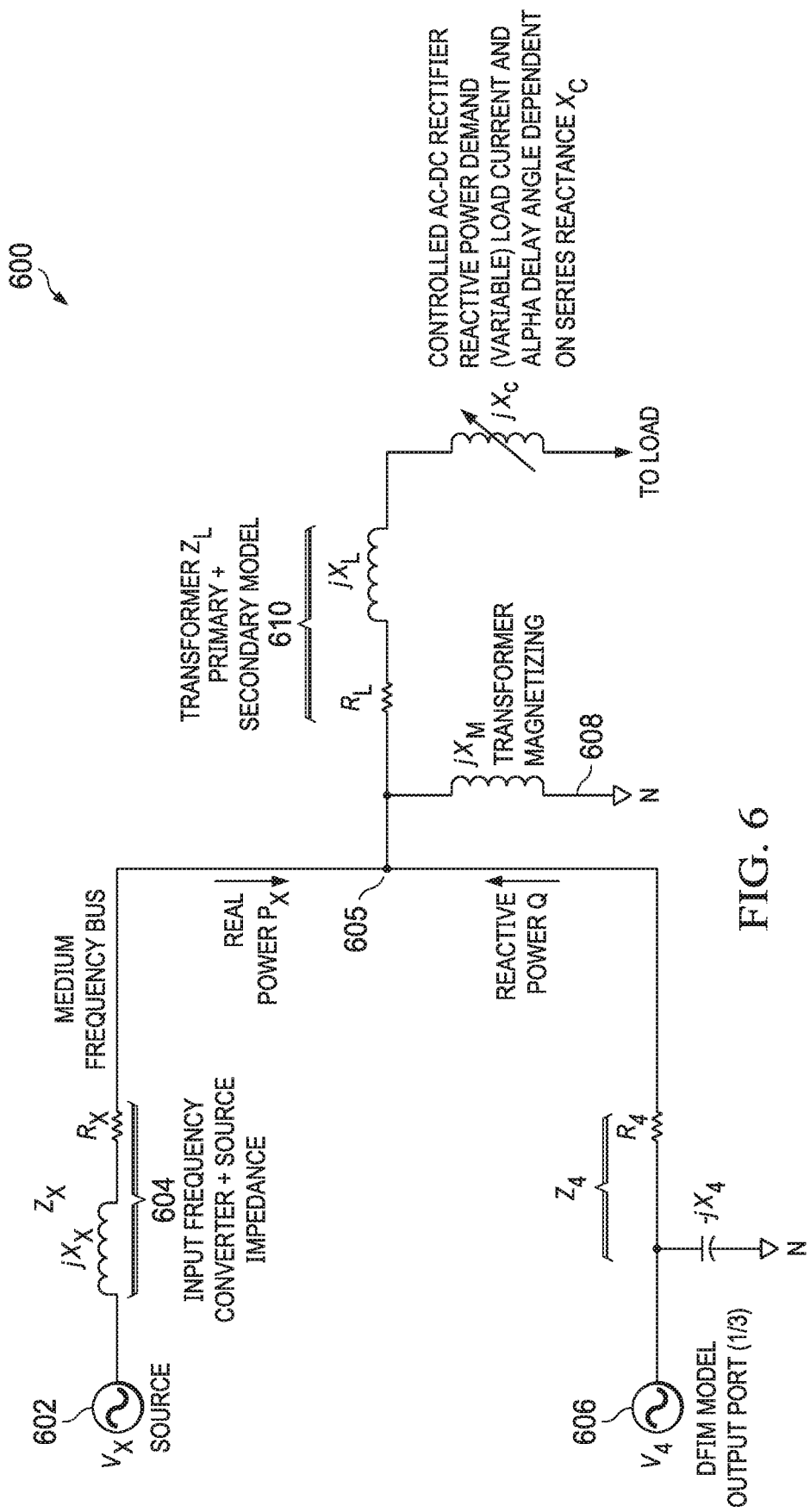
FIG. 6 shows an example equivalent circuit of one of the three output branches shown in FIG. 4 according to this disclosure.

FIG. 6 shows an example equivalent circuit 600 of one of the three output branches shown in FIG. 4 according to this disclosure. As shown in FIG. 6, the circuit 600 models the generator 402 as a source 602 with source voltage Vx, and models the frequency converter 416-418 as an input frequency converter 604 with combined impedance Zx=Rx. The input frequency converter 604 feeds a node 605 at the medium frequency bus. The node 605 also has power injection from the DFIM 406, which is modeled in the circuit 600 as a DFIM 606 with source voltage V4 and series impedance Z4=R4−jX4. The load 410-412 and the transformer with rectifier 420-422 are modeled as a shunt branch 608 having magnetizing reactance Xm and a series branch 610 having impedance ZL=RL+jXL. The reactive power developed by the DFIM 406 for each of its ports fully compensates for reactive power consumed in Xm and XL.

If the load rectifier 420-422 is a phase-controlled bridge device such as a thyristor, when this device has a gate delay (α angle) and a phase back switching of currents, an equivalent reactive demand occurs on the input to the rectifier 420-422, even when the load 410-412 is purely resistive. This reactive demand is especially large in acceleration or transient swings of the load 410-412; it is represented in the circuit 600 by the reactance Xc in series with the load. The consequent reactive demand is a combination of the transformer magnetizing reactance, the transformer leakage reactance and the AC-to-DC converter reactive demand, as explained below. Commutation overlap present in high power thyristor based AC-to-DC converters also adds to the reactive demand. This AC-to-DC converter reactive demand increases as a function of output DC current. The negative reactance −jX4 is a design feature of the DFIM output windings and can match the output reactances Xl+Xc in parallel to Xm, so the input frequency converter has no effective reactive demand.

Figure 7A:
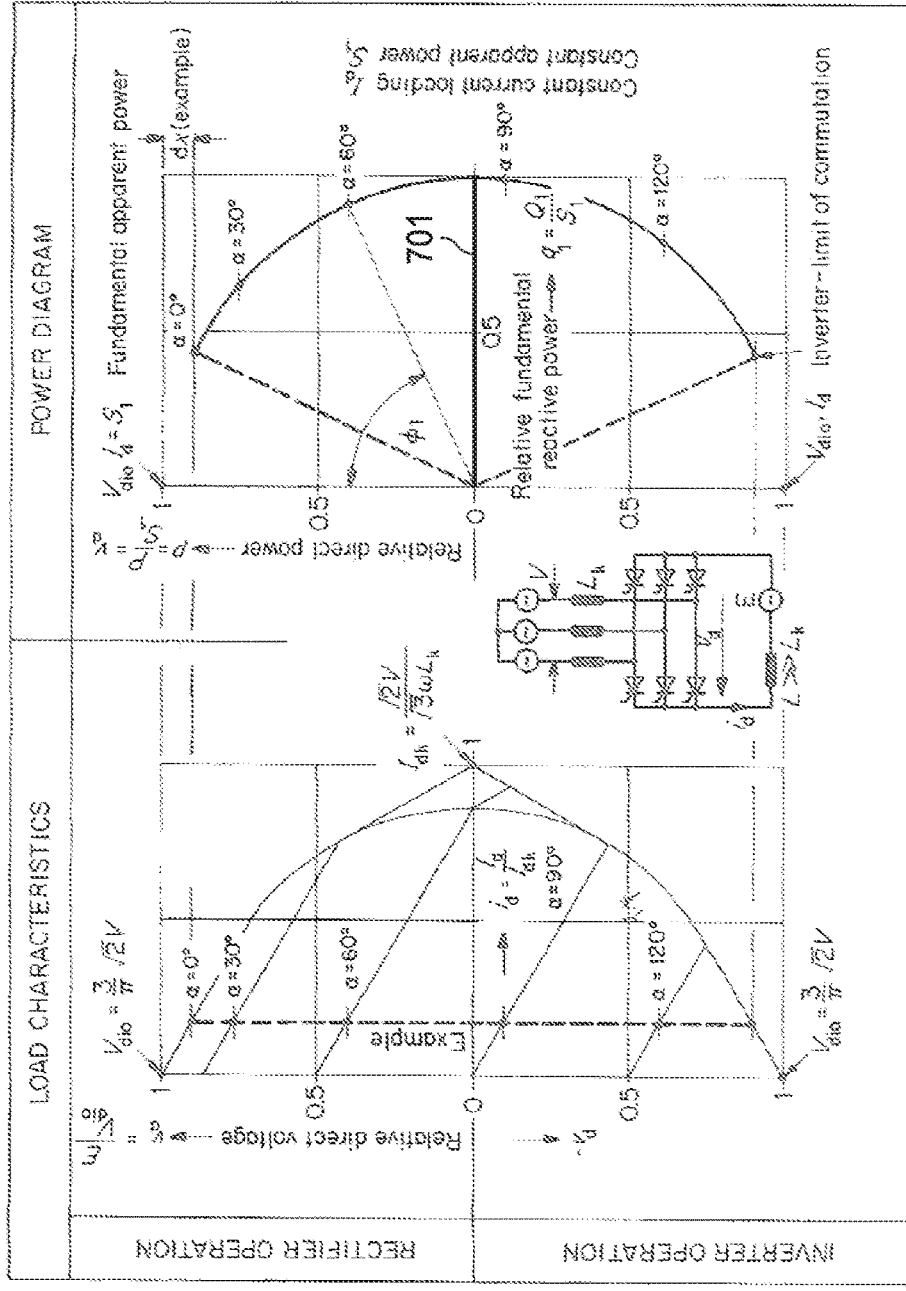
FIGS. 7A through 7D illustrate properties of large conventional power converters.
Figure 7B:
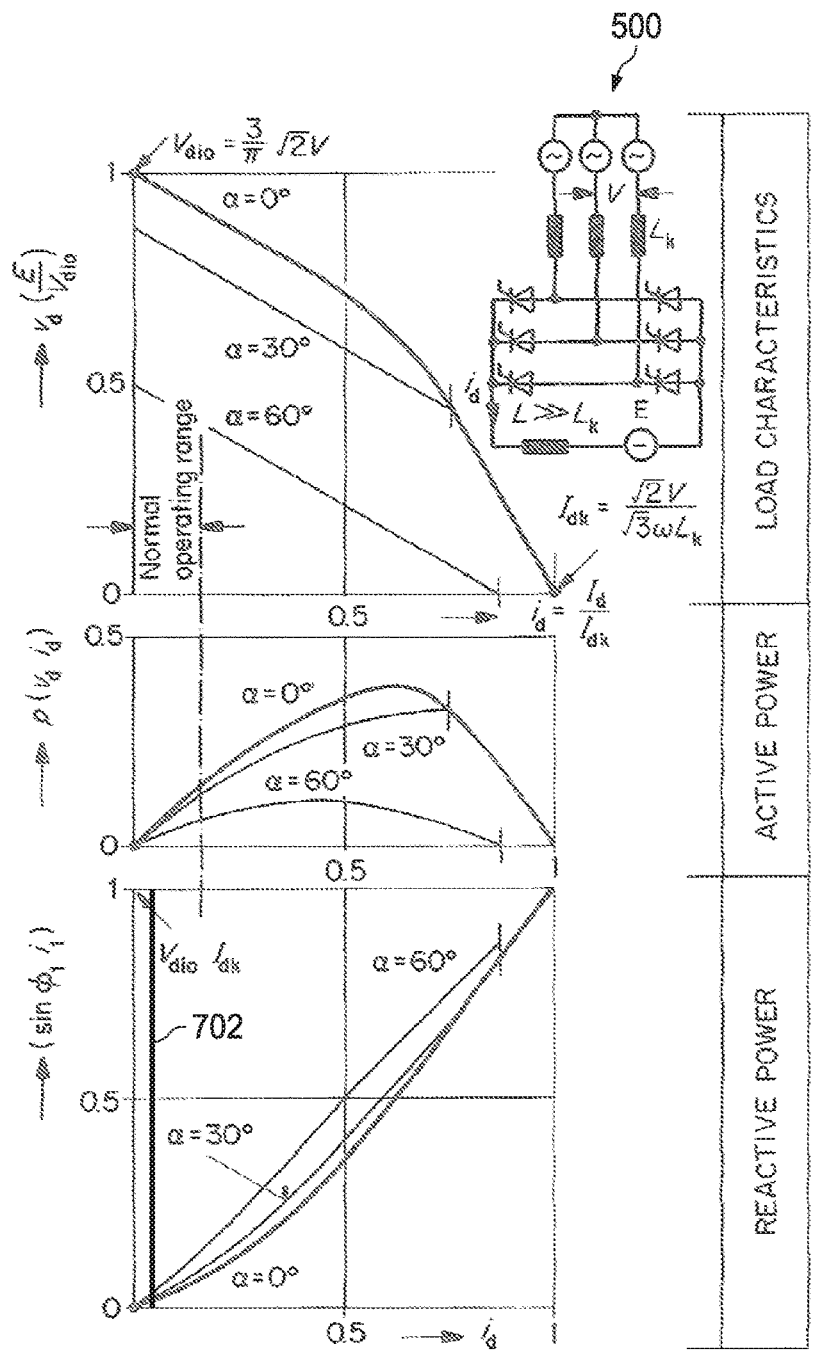

FIGS. 7A through 7D illustrate properties of large conventional power converters. The illustrations in FIGS. 7A through 7D show graphs from the textbook "Basic Guide to Power Electronics" by Albert Kloss-Brown (Boveri & Cie, 1984). FIG. 7A illustrates FIG. 77 from the textbook. The power circle diagram on the right side of FIG. 7A shows normalized reactive power as a function of thyristor gating delay angle α. It is noted that AC-DC converter reactive power demand peaks at about α=87 degrees at 1.0 per unit. FIG. 7B illustrates Figure 81 from the textbook. The lower graph of FIG. 7B shows normalized reactive power as a function of DC load current $i_d$ and α angle. In FIGS. 7A and 7B, lines 701-702 have been added to the figures to illustrate reactive power demand (lagging PF) on the input side of the AC-DC controlled rectifier after the transformer.

Figure 7C:
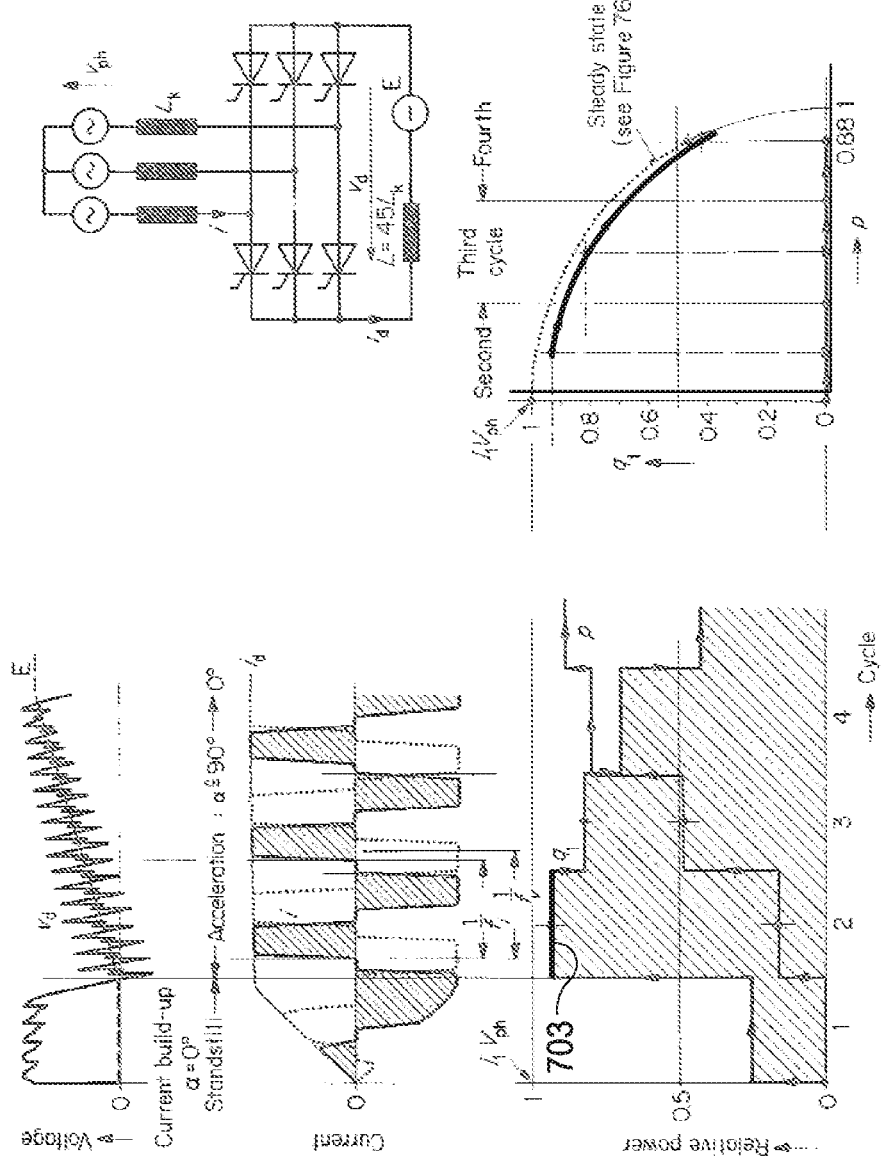
Figure 7D:
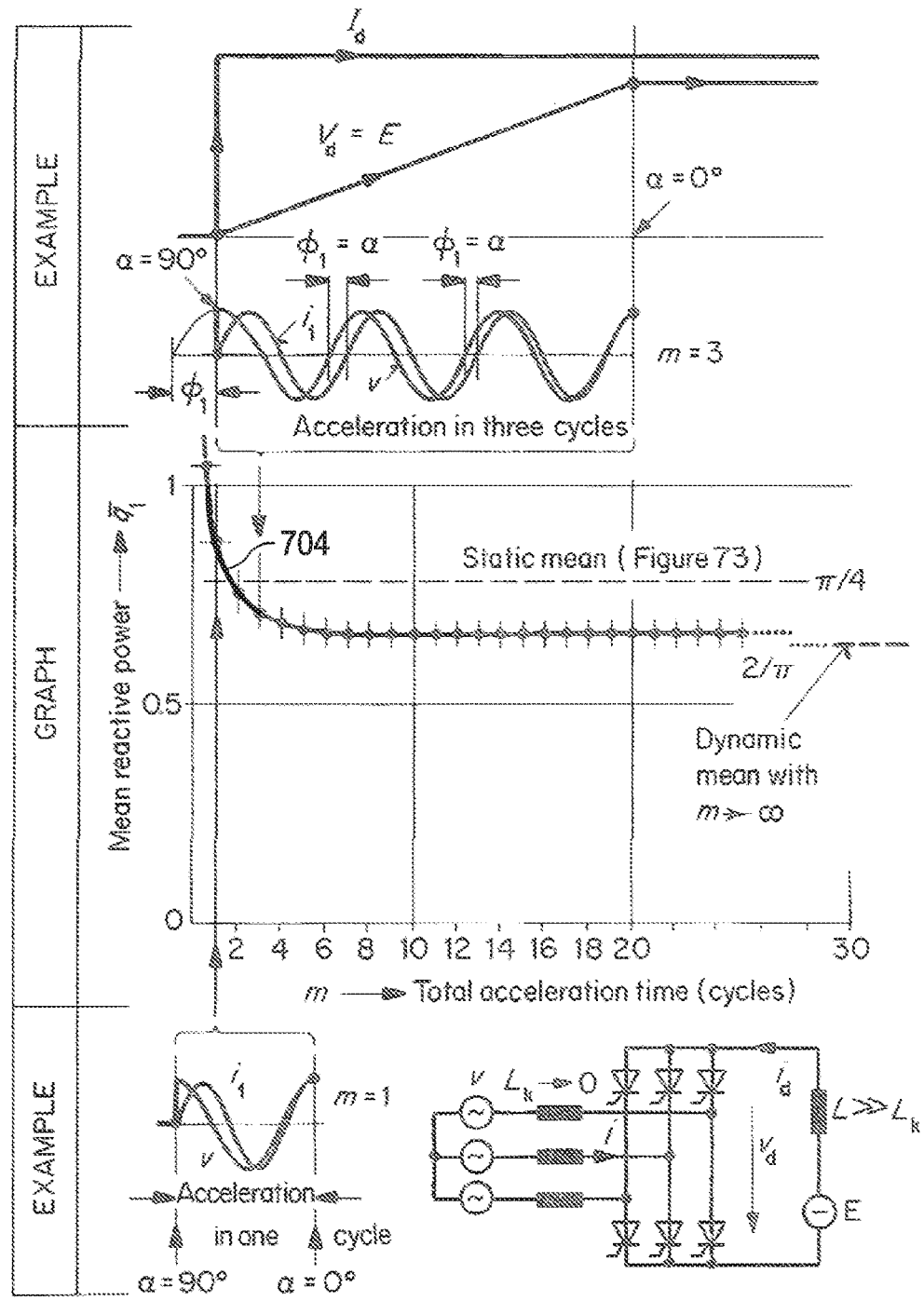

In FIG. 7C, the line 703 shows normalized reactive power input qi to the AC-DC rectifier during acceleration or transient change of load conditions as being very high in the first three cycles. In FIG. 7D, the line 704 shows mean reactive power of about 0.75 per unit during the first three cycles during acceleration region. Thus during rapid load changes, additional reactive power in needed beyond a steady-state requirement.

FIGS. 8A and 8B illustrate example winding diagrams 801-804 for an ABIC machine, such as the DFIM 804, according to this disclosure. As shown in FIGS. 8A and 8B, the ABIC machine is a 2-pole ABIC machine with 108 stator slots and 3 reactive output windings. In FIG. 8A, the winding diagram 801 shows windings for the ABIC main input "M". The winding diagram 802 shows windings for the reactive output Q1 group. In FIG. 8B, the winding diagram 803 shows windings for the reactive output Q2 group. The winding diagram 804 shows windings for the reactive output Q3 group. The blocks M, Q1, M, Q2, etc., shown at the bottom of FIG. 8B are functional blocks illustrating a main winding, which provides the excitation for the machine, followed by a reactive winding. This is then followed by another main winding and another reactive winding. This sequence of windings creates a transient in the machine magnetic circuit, which generates additional leading reactive power.

Although FIGS. 1 through 8B illustrate example systems for augmented bus impedance control and related details, various changes may be made to FIGS. 1 through 8B. For example, while the figures show systems with only one DFIM, this is merely one example. In other embodiments, the systems could include additional DFIMs, including one or more that rotate in the opposite direction. In general, electrical power systems come in a wide variety of configurations, and FIGS. 1 through 8B do not limit this disclosure to any particular configuration.

Figure 9:
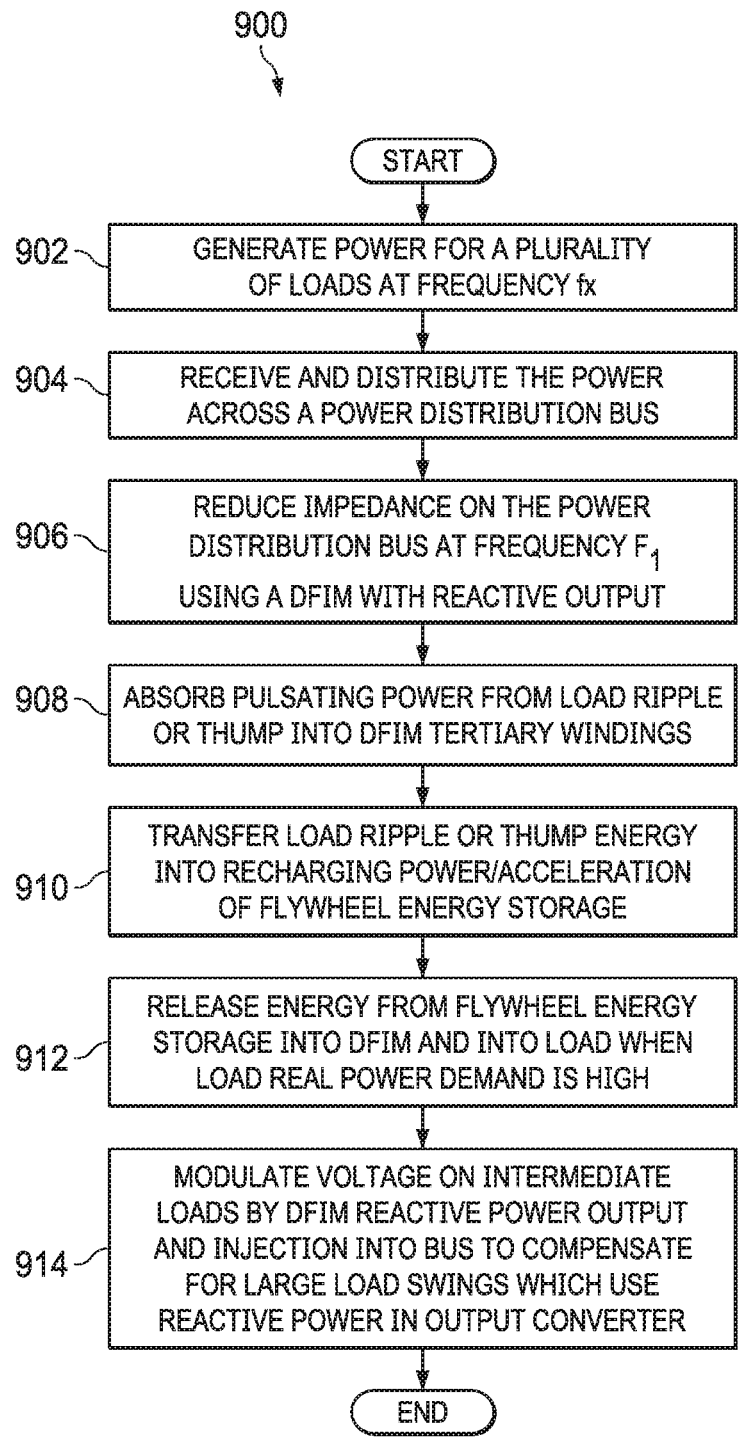
FIG. 9 illustrates an example method for augmented bus impedance control according to this disclosure.

FIG. 9 illustrates an example method 900 for augmented bus impedance control according to this disclosure. For ease of explanation, the method 900 is described as being performed using the system 100 of FIG. 1 or the system 400 of FIG. 4. However, the method 900 could be used with any other suitable device or system.

As shown in FIG. 9, power for a plurality of loads is generated using a power generator at step 902. This may include, for example, the power generator 402 generating power for use in the system 400. The power is received at a power distribution bus and at least some of the power is distributed for use at the loads at step 904. This may include, for example, the power distribution bus 404 distributing power, some of which is used at each of the loads 410-412. Impedance is reduced on the power distribution bus using a shunt connected DFIM in response to a change in power at one or more of the loads at step 906. This may include, for example, the DFIM 406 reducing the impedance on the bus 404 in response to a change in power at one or more of the loads 410-412.

Pulsating power from load ripple or thump is absorbed into tertiary windings of the DFIM 406 at step 908. Load ripple or thump energy is transferred into recharging power or acceleration of flywheel energy storage at step 910. Energy from the flywheel energy storage is released into the DFIM 406 and into load at step 912 when the load real power demand is high. Voltage is modulated, at step 914, on intermediate loads by DFIM reactive power output and injection into the bus to compensate for large load swings which use reactive power in the output converter.

Although FIG. 9 illustrates one example of a method 900 for augmented bus impedance control, various changes may be made to FIG. 9. For example, while shown as a series of steps, various steps shown in FIG. 9 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A system comprising:
 a power distribution bus configured to distribute power from an electrical power source;

a plurality of electrical loads configured to receive portions of the power from the electrical power source, wherein real and reactive power associated with one of the electrical loads oscillate at a low frequency and generate a thump condition, and wherein the low frequency is greater than 1 Hertz;

a plurality of frequency converters connected in parallel on the power distribution bus, each frequency converter corresponding to one of the electrical loads, each frequency converter configured to convert a frequency of the power from the electrical power source to an output frequency associated with the corresponding electrical load and provide primarily real power to the corresponding electrical load;

a flywheel configured to rotate in order to store inertial energy that is convertible to power one or more of the electrical loads;

a doubly-fed induction machine (DFIM) coupled to the flywheel and comprising a plurality of DFIM tertiary winding ports, each DFIM tertiary winding port configured to provide leading reactive power to a corresponding one of the electrical loads, the DFIM configured to:

reduce transmission impedance and reduce voltage drop on the power distribution bus in response to a change in power at one or more of the electrical loads; and extract energy associated with the thump condition from or return energy associated with the thump condition to the flywheel in order to reduce an impact of the thump condition on the electrical power source or the system; and a plurality of nodes, each node corresponding to one of the electrical loads, each node configured to combine the primarily real power from the corresponding frequency converter and the leading reactive power from the corresponding DFIM tertiary winding port.

2. The system of claim 1, wherein:
the power associated with the one of the electrical loads oscillates between regenerative power and non-regenerative power; and
the DFIM is configured to receive at least some of the regenerative power and use the at least some of the regenerative power to increase the inertial energy stored at the flywheel.

3. The system of claim 1, wherein the DFIM comprises a plurality of output ports, each output port configured to absorb at least some of the energy associated with the thump condition independent of the other output ports.

4. The system of claim 1, further comprising:
a DFIM exciter configured to vary an excitation current and frequency on a secondary winding of the DFIM to be inversely proportional to a shaft speed of the flywheel so as to maintain each output frequency on a tertiary winding at a substantially constant value over variations in the shaft speed and inertial stored energy.

5. The system of claim 4, wherein each of the electrical loads has a reactive power demand or reactive power oscillation.

6. The system of claim 1, wherein the power distribution bus comprises an alternating current (AC) power distribution bus.

7. The system of claim 1, wherein the plurality of electrical loads comprises a first load configured to pulse at a first frequency and a second load configured to pulse at a second frequency different than the first frequency.

8. The system of claim 1, wherein the frequency converters comprise AC-to-AC frequency converters.

9. A system comprising:
a power generator configured to generate power for a plurality of electrical loads, wherein real and reactive power associated with one of the electrical loads oscillate at a low frequency and generate a thump condition, and wherein the low frequency is greater than 1 Hertz;

a power distribution bus configured to receive and distribute the power from the power generator;

a plurality of frequency converters connected in parallel on the power distribution bus, each frequency converter corresponding to one of the electrical loads, each frequency converter configured to convert a frequency of the power from the power generator to an output frequency associated with the corresponding electrical load and provide primarily real power to the corresponding electrical load;

a flywheel configured to rotate in order to store inertial energy that is convertible to power one or more of the electrical loads;

a doubly-fed induction machine (DFIM) coupled to the flywheel and comprising a plurality of DFIM tertiary winding ports, each DFIM tertiary winding port configured to provide leading reactive power to a corresponding one of the electrical loads, the DFIM configured to:

reduce transmission impedance and reduce voltage drop on the power distribution bus in response to a change in power at one or more of the electrical loads; and extract energy associated with the thump condition from or return energy associated with the thump condition to the flywheel in order to reduce an impact of the thump condition on the power generator or the system; and a plurality of nodes, each node corresponding to one of the electrical loads, each node configured to combine the primarily real power from the corresponding frequency converter and the leading reactive power from the corresponding DFIM tertiary winding port.

10. The system of claim 9, wherein:
the power associated with the one of the electrical loads oscillates between regenerative power and non-regenerative power; and
the DFIM is configured to receive at least some of the regenerative power and use the at least some of the regenerative power to increase the inertial energy stored at the flywheel.

11. The system of claim 9, wherein the DFIM comprises a plurality of output ports, each output port galvanically isolated from other ports and configured to absorb at least some of the energy associated with the thump condition independent of the other output ports.

12. The system of claim 9, further comprising:
a DFIM exciter configured to vary an excitation current and frequency on a secondary winding of the DFIM to be inversely proportional to a shaft speed of the flywheel so as to maintain each output frequency on a tertiary winding at a substantially constant value over wide variations in the shaft speed.

13. The system of claim 9, wherein each of the electrical loads has a reactive power demand or reactive power oscillation.

14. The system of claim 9, wherein the power distribution bus comprises an alternating current (AC) power distribution bus.

15. The system of claim 9, wherein the plurality of electrical loads comprises a first load configured to pulse at a first frequency and a second load configured to pulse at a second frequency different than the first frequency.

16. The system of claim 9, wherein the frequency converters comprise AC-to-AC frequency converters.

17. A method comprising:
generating power for a plurality of electrical loads using an electrical power generator;
receiving the power at a power distribution bus and distributing at least some of the power for use at the electrical loads, wherein real and reactive power associated with one of the electrical loads oscillate at a low frequency and generate a thump condition, and wherein the low frequency is greater than 1 Hertz;
converting, by a plurality of frequency converters, a frequency of the power from the electrical power generator to output frequencies associated with corresponding electrical loads and providing primarily real power to the corresponding electrical loads, the frequency converters connected in parallel on the power distribution bus, each frequency converter corresponding to one of the electrical loads;
reducing transmission impedance on the power distribution bus using a doubly-fed induction machine (DFIM) in response to a demand in reactive power at one or more of the electrical loads;
providing, via a plurality of DFIM tertiary winding ports, leading reactive power to corresponding ones of the electrical loads;
rotating a flywheel coupled to the DFIM in order to store inertial energy and to buffer the electrical power generator from oscillations in power associated with one of the electrical loads;
extracting energy associated with the thump condition from or returning energy associated with the thump condition to the flywheel via the DFIM in order to reduce an impact of the thump condition on the electrical power generator; and
combining the primarily real power from the corresponding frequency converters and the leading reactive power from the corresponding DFIM tertiary winding ports at a plurality of nodes, each node corresponding to one of the electrical loads.

18. The method of claim 17, wherein the DFIM comprises a non-symmetrical, space-transient winding that generates the leading reactive power in the plurality of DFIM tertiary winding ports, that operates at a voltage level different from primary or secondary windings, and that compensates for at least some of the reactive power demanded by the electrical loads.

19. The method of claim 17, wherein a secondary winding of the DFIM is coupled to a DFIM excitation power source, the DFIM excitation power source configured to enable the DFIM tertiary winding ports to provide leading or lagging reactive power to compensate for oscillating load condition power factor on a recurrent or transient basis.

20. The method of claim 19, wherein:
the DFIM comprises a plurality of polyphase and galvanically isolated output ports; and
the method further comprises absorbing at least some of the energy associated with the thump condition at each output port independent of the other output ports.

* * * * *